US008127229B2

(12) United States Patent
Inoguchi et al.

(10) Patent No.: US 8,127,229 B2
(45) Date of Patent: Feb. 28, 2012

(54) CONTROLLING FOCUS, AND MOVEMENT OF THE FOCUS, BETWEEN FOCUS ITEMS IN A MULTI-FRAME DOCUMENT

(75) Inventors: Yohei Inoguchi, Kawaguchi (JP); Takeshi Sasaki, Sunnyvale, CA (US); Tat Jhetson, Tokyo (JP)

(73) Assignee: Access Co., Ltd., Tokyo (JP)

( * ) Notice: Subject to any disclaimer, the term of this patent is extended or adjusted under 35 U.S.C. 154(b) by 1136 days.

(21) Appl. No.: 11/661,455

(22) PCT Filed: Jun. 23, 2005

(86) PCT No.: PCT/JP2005/011507
§ 371 (c)(1),
(2), (4) Date: Feb. 28, 2007

(87) PCT Pub. No.: WO2006/025145
PCT Pub. Date: Mar. 9, 2006

(65) Prior Publication Data
US 2008/0134017 A1   Jun. 5, 2008

(30) Foreign Application Priority Data
Aug. 31, 2004   (JP) .................................. 2004-252961

(51) Int. Cl.
*G06F 17/28* (2006.01)
*G06F 3/048* (2006.01)

(52) U.S. Cl. ........ 715/273; 715/810; 715/819; 715/820; 715/818; 715/817; 715/825; 715/829; 715/841

(58) Field of Classification Search .................. 715/273, 715/810, 819, 820, 818, 817, 825, 829, 841
See application file for complete search history.

(56) References Cited

U.S. PATENT DOCUMENTS

| 5,151,975 A * | 9/1992 | Shiraki et al. ............... 715/202 |
| 6,415,303 B1 * | 7/2002 | Meier et al. ................. 715/202 |
| 6,567,546 B1 * | 5/2003 | Eguchi et al. ............... 382/181 |
| 7,016,704 B2 * | 3/2006 | Pallakoff ..................... 455/566 |
| 7,636,897 B2 * | 12/2009 | Koralski et al. ............. 715/767 |
| 7,672,692 B2 * | 3/2010 | Nishino et al. .............. 455/566 |
| 7,693,817 B2 * | 4/2010 | Dumais et al. ........ 707/999.002 |
| 7,730,012 B2 * | 6/2010 | Arrouye et al. .................... 1/1 |
| 7,782,400 B2 * | 8/2010 | Harada et al. ............... 348/569 |
| 2002/0041292 A1 * | 4/2002 | Son et al. ...................... 345/810 |
| 2002/0151283 A1 * | 10/2002 | Pallakoff ....................... 455/90 |

(Continued)

FOREIGN PATENT DOCUMENTS
JP          2000298543 A       10/2000
(Continued)

*Primary Examiner* — Doug Hutton, Jr.
*Assistant Examiner* — Soumya Dasgupta
(74) *Attorney, Agent, or Firm* — Morrison & Foerster LLP

(57) ABSTRACT

The present invention enables a focus to be moved easily among focus items in different frames when frames are displayed. To do so, the last focused item in an in-frame document once activated is stored (S11) and, when a frame movement event is caused by a focus movement operation (S12, Yes), the focus is moved to a focus item stored for a new frame (S13). If the stored focus item is not in the display area of the frame, the focus is moved preferably to a predetermined (for example, the first) focus item in the display area. Operation means for the focus movement operation may be used with frame switching means for switching the active frame among frames.

13 Claims, 17 Drawing Sheets

U.S. PATENT DOCUMENTS

| | | | |
|---|---|---|---|
| 2004/0111671 A1* | 6/2004 | Lu et al. | 715/513 |
| 2004/0133923 A1* | 7/2004 | Watson et al. | 725/134 |
| 2004/0141007 A1* | 7/2004 | Amari et al. | 345/771 |
| 2004/0250217 A1* | 12/2004 | Tojo et al. | 715/810 |
| 2005/0102635 A1* | 5/2005 | Jiang et al. | 715/851 |
| 2007/0067104 A1* | 3/2007 | Mays | 701/211 |
| 2007/0130200 A1* | 6/2007 | Ogren | 707/104.1 |
| 2009/0183108 A1* | 7/2009 | Arrouye et al. | 715/781 |
| 2009/0319899 A1* | 12/2009 | Moon et al. | 715/716 |

FOREIGN PATENT DOCUMENTS

| | | |
|---|---|---|
| JP | 2002288223 A | 10/2002 |
| JP | 2004038896 A | 2/2004 |
| JP | 2005025256 A | 1/2005 |

* cited by examiner

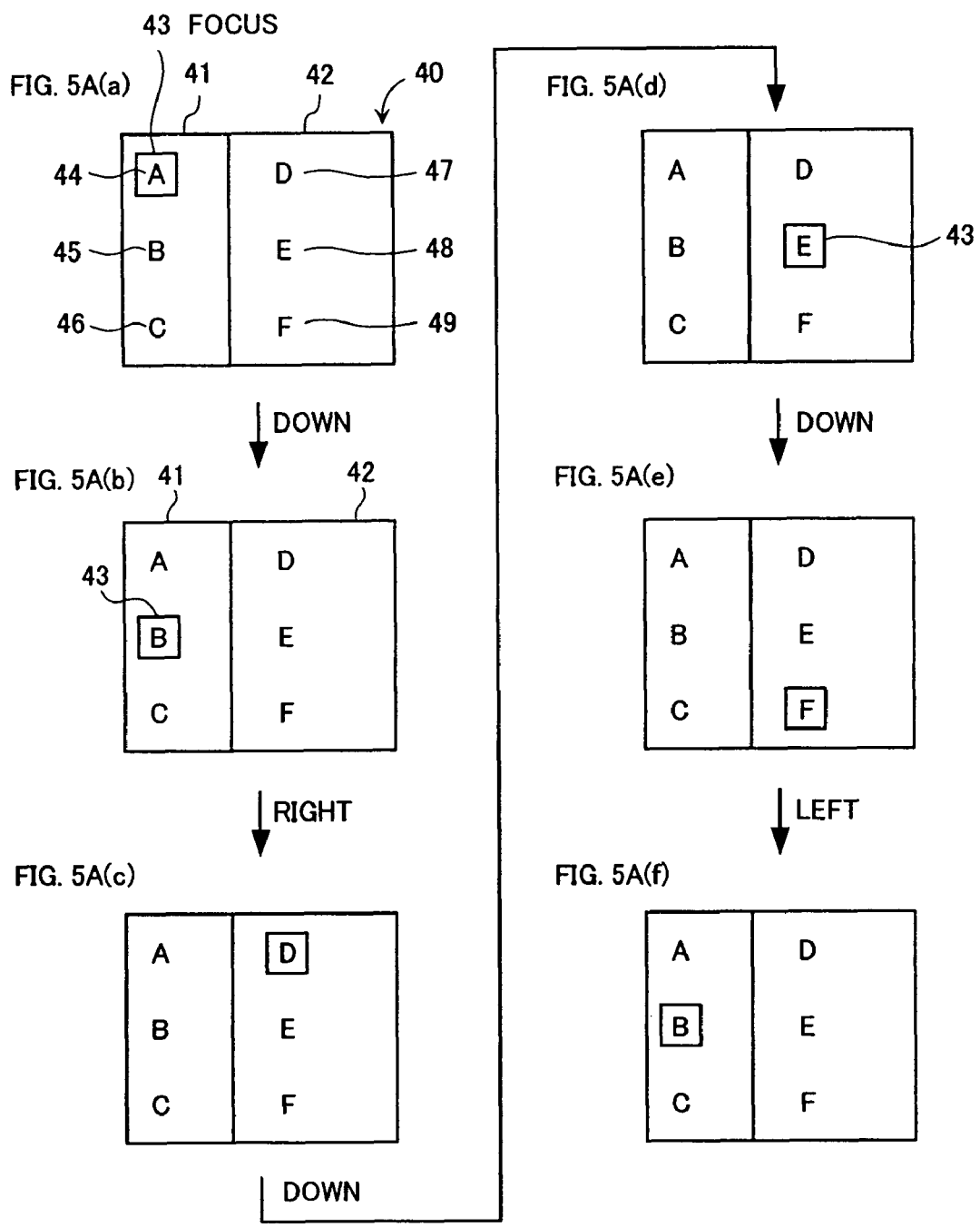

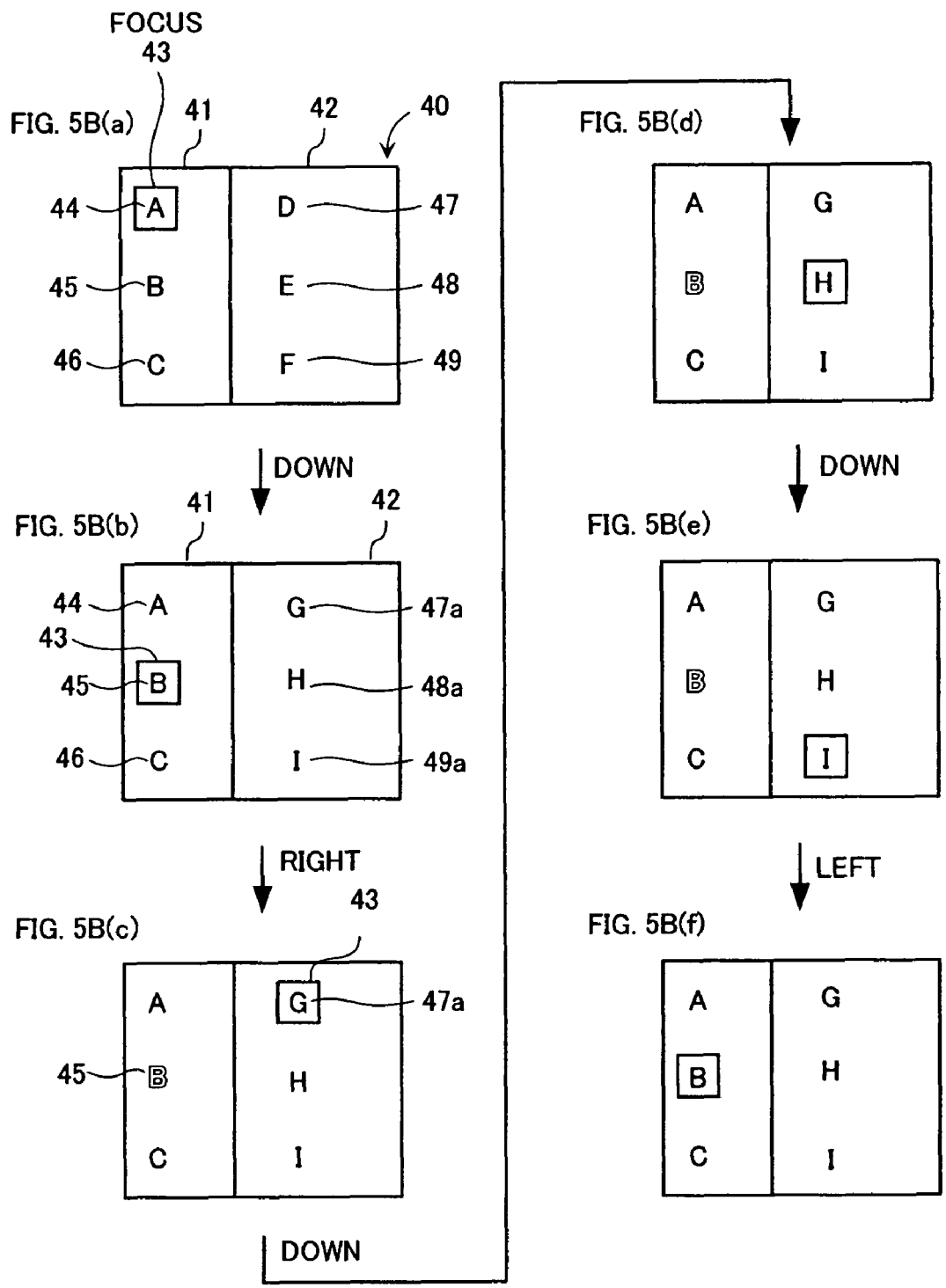

71 MENU FRAME
72 ANOTHER FRAME

74 MENU FRAME
72 ANOTHER FRAME

CONTROLLING FOCUS, AND MOVEMENT OF THE FOCUS, BETWEEN FOCUS ITEMS IN A MULTI-FRAME DOCUMENT

CROSS REFERENCE TO RELATED APPLICATIONS

This application is a 35 U.S.C. §371 National Stage filing of International Patent Application No. PCT/JP2005/011507, titled MARKUP LANGUAGE PROCESSING DEVICE, BROWSER PROGRAM, AND MARKUP LANGUAGE PROCESSING METHOD, filed Jun. 23, 2005, which claims the benefit of Japanese Application No. 2004-252961, titled MARKUP LANGUAGE. PROCESSING DEVICE, BROWSER PROGRAM, AND MARKUP LANGUAGE PROCESSING METHOD, filed Aug. 31, 2004, both of which are incorporated herein by reference in their entireties.

TECHNICAL FIELD

The present invention relates to a markup language document processing device, a browser program, and a markup language processing method for processing a document described in a markup language.

BACKGROUND ART

A document browsed on at a website on the Internet is usually a document described in a markup language such as HTML (Hyper Text Markup language). Although a document described in a markup language is, per se, a text; the user can include character decoration information, such as the font size and colors, and an image, specify their layouts, and set a link to other items in the same document or to other documents and images. The software (computer program) that interprets tag information, included in a document described in such a markup language, and arranges the layout of the document to allow the user to browse its contents is called a browser.

An "onscreen link" defined by the anchor tag is a link to another location in the same document, to another document (including an image), or to a specific function, usually highlighted by an underline, a frame, or a color on the display screen to indicate that the link is set. The user can select this onscreen link to move to another display position or to start a specific function. On a personal computer, the user can select (click) this onscreen link with the use of a pointing device such as a mouse and move to the link destination.

On a mobile phone with the web browsing capability, a document described in a similar markup language can be interpreted and displayed. In addition to HTML described above, compactHTML, XML (eXtensible Markup Language), BML (Broadcast Markup Language), etc. are known as the markup language. The BML is a language used not on the Internet but for data broadcast.

Different documents can also be displayed in the divided areas, called frames, created by dividing the display screen into plural display areas. Patent Document 1 discloses a technique for use on a browser display device, capable of displaying plural frames, to switch the active frame from one frame to another by pressing a single frame switching key.

Patent Document 1: Japanese Patent Laid-Open Publication No. 2000-298543

DISCLOSURE OF THE INVENTION

Problems to be Solved by the Invention

Although a television set or a mobile phone having the capability to connect to the Internet also allows the user to browse a web, a device that has not a pointing device (hereinafter called direct pointing means) used to directly select an onscreen link, such as a mouse or a touch panel, usually has an operation key (or button) used to move the focus sequentially from one onscreen link to another. In this specification, the focus is considered a kind of cursor, and this cursor movement operation means is called a focus movement operation means.

On such a device, each onscreen link is treated as an object to be focused or a focus item, and the user can operate the focus movement operation means to move the focus in a desired direction—up, down, left, and right—sequentially from one onscreen link to another. An instruction to move to the link destination of a focused onscreen link is given by pressing for example the Enter key.

On a device with no direct pointing means such as the one described above, it is not easy to move the focus to a focus item in the frame display where the display screen is divided into plural areas.

The conventional, well-known focus movement control is carried out in such a way that a specific operation key (for example, a tab key) is successively pressed to move the focus sequentially to all focus items in a frame and, after the focus reaches the last focus item in that frame, move the focus to the first focus item in the next frame in a predetermined frame sequence. This focus movement operation is repeated and, after the focus reaches the last focus item in the last frame, the focus returns to the first focus item in the first frame.

In both the frame-to-frame focus movement by means of such focus movement operation means and the active frame movement by means of the frame switching key described above (that is, frame-to-frame focus movement), no special consideration is given to the position to which the focus is once moved and, then, is returned thereto. That is, the focus returns only to a specific focus item (head or tail focus item in the frame) that is determined uniformly in advance.

However, such a frame-to-frame focus movement is not easy to use in a practical application.

In view of the foregoing, it is an object of the present invention to provide a markup language document processing device, a browser program, and a markup language processing method that can carry out new focus movement control for implementing easy-to-use focus movement among focus items across different frames.

Means to Solve the Problems

A markup language document processing device according to the embodiment is a markup language document processing device that processes a document described in a markup language comprising a focus movement operation means for giving an instruction to move a focus sequentially to a plurality of focus items on a display screen; and a control means for controlling the movement of the focus in response to an operation of the focus movement operation means. This control means determines to move the focus into a second frame across a frame border when the display screen includes a plurality of frames and there is no focus item in a first frame in a direction into which the focus is to move in response to a focus movement operation performed by the focus movement operation means, stores information on a last focused focus item in the first frame before the movement, and moves the focus to the focus item determined based on the stored information on the focus item when a focus movement from a frame other than the first frame to the first frame across a frame border is determined by the operation of the focus movement operation means. In this specification, the first and second frames do not refer to specific frames but are used for convenience to easily distinguish between one frame and another. If there are a plurality of second frames when the focus is moved from the first frame into the second frame, which frame the focus moves to is determined by a predetermined rule as will be described later. The expression "there is no focus item in a direction into which the focus is to move" will be described later in detail.

Storing the information on the last focused focus item in the first frame before the movement when the focus is moved to a focus item in the second frame across the frame border makes it possible to move the focus to the focus item determined based on the stored information on the focus item when the focus movement from some other frame back to the first frame across the frame border is performed by the focus movement operation means. This reduces the number of redundant focus movement operations required when the user usually browses documents displayed in frames.

The "focus item determined based on the stored information on the focus item" includes the "stored focus item" itself and a focus item having a predetermined relation (for example, a next-order) with the "stored focus item".

If no focus item is stored for the second frame when the focus is moved from the first frame to the second frame by the operation of the focus movement operation means, the focus can be moved to a focus item determined by a predetermined rule. The "focus item determined by a predetermined rule" is a focus item determined by a predetermined rule, for example, the first focus item in the in-frame document, the nearest focus item in the display area of the frame from the position of the source focus item, the first focus item of the plural focus items appearing in the display area of the frame, and so on. The word "first" means the first in sequence and, more specifically, the focus item positioned in the upper-left corner in the in-frame display area in this embodiment.

If the focus item determined based on the information on the focus item stored for the first frame is not in a current display area of the first frame when the focus movement from a frame other than the first frame to the first frame across a frame border is determined by the operation of the focus movement operation means, the focus may also be moved to a focus item that is one of the focus items displayed in the display area and that is determined by a predetermined rule. This movement will reduce the average number of operation steps.

When the control means activates only one of a plurality of frames at a time and focuses on a focus item only in the activated frame, the control means may further comprise frame switching means that switches an active frame among the plurality of frames not via the operation of the focus movement operation means. The control means moves the focus to the focus item determined based on the stored information on the focus item also when the focus movement from a frame other than the first frame to the first frame is determined by the frame switching means. The control means, combined with the frame switching means, can perform the focus movement operation even when the number of operations exceptionally increases during the processing described above.

The storage means that stores information on the last focused focus item may store the information for each frame or store the information only for an in-frame document displayed on the display screen.

The markup language document processing device may further comprise focus reset means for forcing a current focus in a frame to move to a predetermined focus item position. This focus reset means allows the user to directly move the focus to the first focus item in the display area of the frame.

A browser program according to the present invention that processes a document described in a markup language causes a computer to perform the steps of giving an instruction to move a focus sequentially to a plurality of focus items on a display screen in response to a focus movement instruction; determining to move the focus into a second frame across a frame border when the display screen includes a plurality of frames and there is no focus item in a first frame in a direction into which the focus is to move in response to the instruction to move the focus; storing information on a last focused focus item in the first frame before the movement, and moving the focus to the focus item determined based on the stored information on the focus item when a focus movement from the second frame to the first frame across a frame border is determined by the focus movement operation.

EFFECTS OF THE INVENTION

According to the present invention, the focus movement operation means can be used to move the focus to a focus item across frames more easily. This ability enables even a device, which is not provided with means such as a pointing device for directly pointing a focus item, to easily move the focus on the markup language document processing device. In addition, the operability of a television set or a portable terminal device, which uses the markup language document processing device, can be increased.

BRIEF DESCRIPTION OF THE DRAWINGS

FIGS. 5A(a)-(f) is a diagram showing an example of the transition of a display screen, which has two frames, for showing an example of the basic operation of the embodiment of the present invention;

FIGS. 5B(a)-(f) are diagrams showing an example of the transition of a display screen, which has two frames, for showing another example of the basic operation of the embodiment of the present invention;

BEST MODE FOR CARRYING OUT THE INVENTION

Preferred embodiments of the present invention will be described in detail below with reference to the drawings.

Figures 1A, 1B:
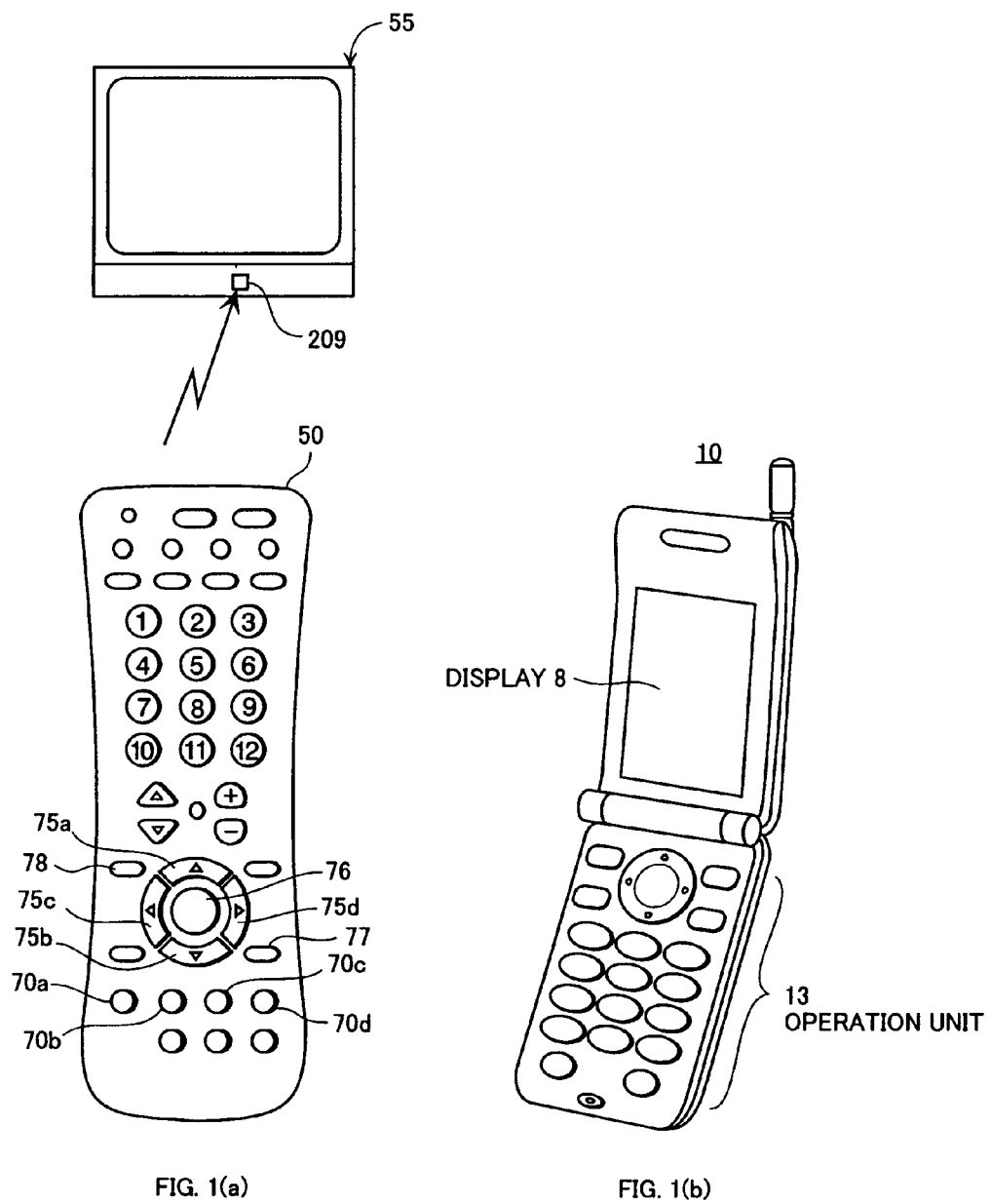
FIGS. 1(a), (b) are diagrams showing the external view of a television set and a mobile phone that are examples of a markup language document processing device to which the present invention is applied.

FIGS. 1(a), (b) show the external view of a television set (a) and that of a mobile phone (b) that are examples of markup language document processing devices to which the present invention is applied.

A television set 55 in this embodiment is an example of a television set designed for use with data broadcast, that is, designed for BML and HTML, and this television set comes with a dedicated remote control 50. This television set 55 can display information obtained not only via broadcast but also via the Internet or a communication network. The remote control 50 has channel keys and other keys, as well as the so-called color buttons 70a-70d. The color buttons are assigned specific colors, that is, red, blue, yellow, and green, in advance. One example of color button usage is that the onscreen links (hereinafter called objects) displayed by the browser are displayed, each in one of the colors, and the user presses one of the color buttons to activate the object (focus item) corresponding to the color to start the operation predetermined for the object. The remote control 50 has up, down, left, and right direction pointing keys (75a-75d) and a enter key 76 (The direction pointing keys 75a-75d are simply called pointing keys 75 when referenced generically. This applies also to other reference numerals).

Color buttons are used when there are a small number of objects but, when the number of objects increases, the pointing keys 75 and enter key 76 must be used.

Note that the remote control 50 may be a remote control that has no color button. The communication medium of the remote control 50 is usually an infrared ray (IrDA) but is not limited thereto and, furthermore, the communication medium may be wired or wireless.

Although the television set 55 shown in FIG. 1(a) includes therein a markup language document processing device, the markup language document processing device may also be externally installed on the television set such as a set-top box.

A mobile phone 10 shown in FIG. 1(b) is a fold-type device composed of an upper part and a lower part that are connected by a hinge. The upper part has a display 8, and the lower part has an operation unit 13 that includes the ten-keypad keys and the cursor movement operation keys. The mobile phone to which the present invention is applied is not limited to a mobile phone that is folded in two. A recent mobile phone has a large screen where information is displayed in frames. The user can perform the cursor movement operation to move from one focus item to another.

Figure 2:
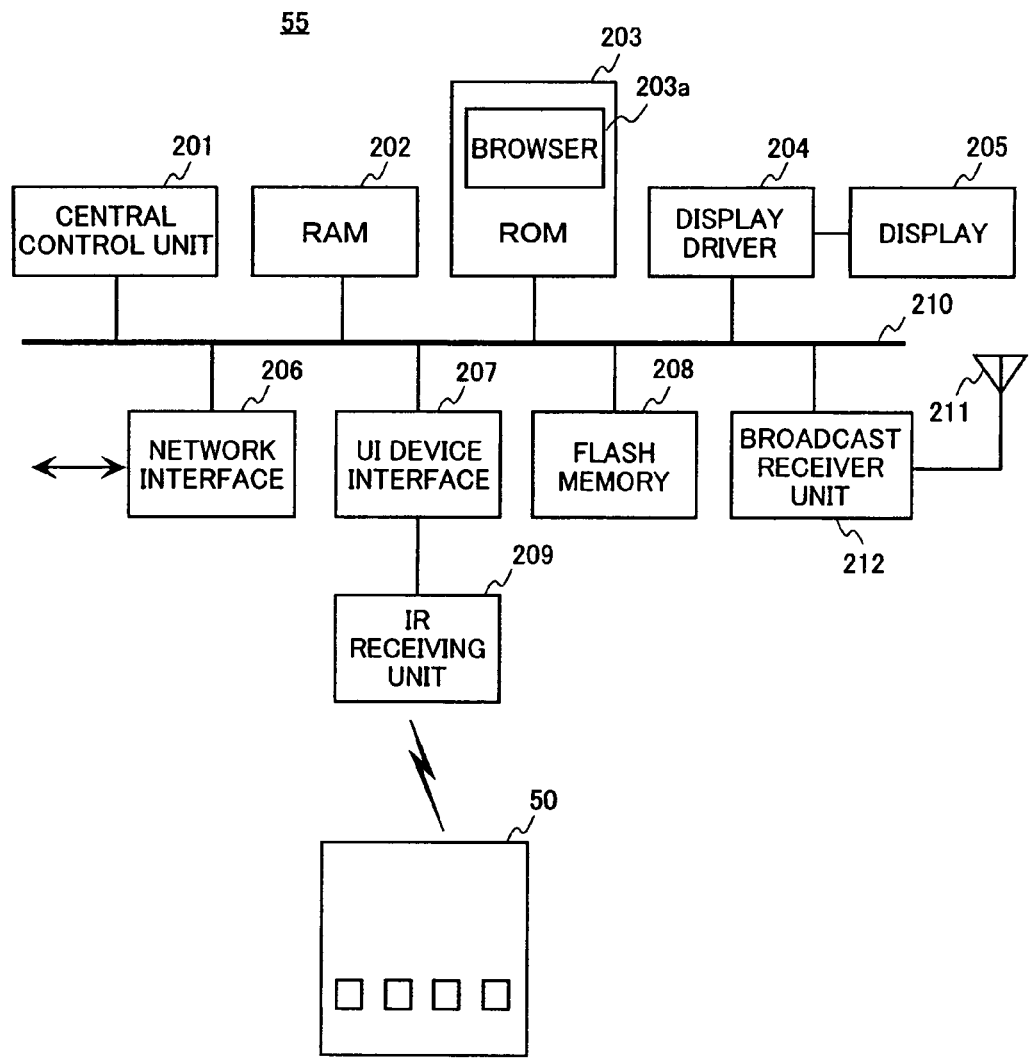
FIG. 2 is a block diagram showing an example of the configuration of the television set shown in FIGS. 1(a), (b)

FIG. 2 is a block diagram showing an example of the configuration of the television set 55. The television set 55, an information processing device in which the browser according to the present invention is installed, comprises a central control unit 201, a RAM 202, a ROM 203, a display driver 204, a display 205, a network interface 206, a user interface (UI) device interface 207, a flash memory 208, an IR receiving unit 209, an antenna 211, and a broadcast receiver unit 212 that can receive data broadcast.

The central control unit 201, RAM 202, ROM 203, display driver 204, network interface 206, user interface (UI) device interface 207, flash memory 208, and broadcast receiver unit 212 are interconnected by a bus 210 via which data and commands are sent and received.

The RAM 202 is a memory in which data (including markup language document), which is obtained from a result of operation in the central control unit 201 or from an external source, is temporarily stored. The ROM 203 is a nonvolatile memory in which programs such as the operating system (OS) and a browser 203a are stored and, from there, the central control unit 201 reads those programs and executes predetermined processing according to the programs. The flash memory 208 is a rewritable, nonvolatile memory in which information such as externally-obtained data, mail addresses, and URLs are saved for later processing. Although stored in the ROM 203 in this example, the browser 203a may also be stored in the flash memory 208. The network interface 206, for example, composed of a LAN board, establishes a connection with an external network (Internet, etc.) for sending data to, and receiving data from, the network. The user interface device interface 207 receives an input from the remote control 50, for example, via the IR receiving unit 209, and sends the received input to the central control unit 201. Upon receiving an infrared signal emitted form the remote control 50, the IR receiving unit 209 converts the received signal to an electrical signal and passes the electrical signal to the user interface device interface 207.

The display driver 204 receives display information, such as a document or an image, from the central control unit 201 and, based on this information, drives the display. The display 205, which is any display device such as a liquid crystal display device, a CRT display device, or a plasma display device, optically displays the screen based on the drive signal received from the display driver 204. The broadcast receiver unit 212 extracts a desired channel signal from the broadcast wave received by the antenna 211 and demodulates the extracted signal for reproduction. The broadcast receiver unit 212 may be a unit that may receive a ground wave data broadcast transmitted to a mobile phone.

Figure 3:
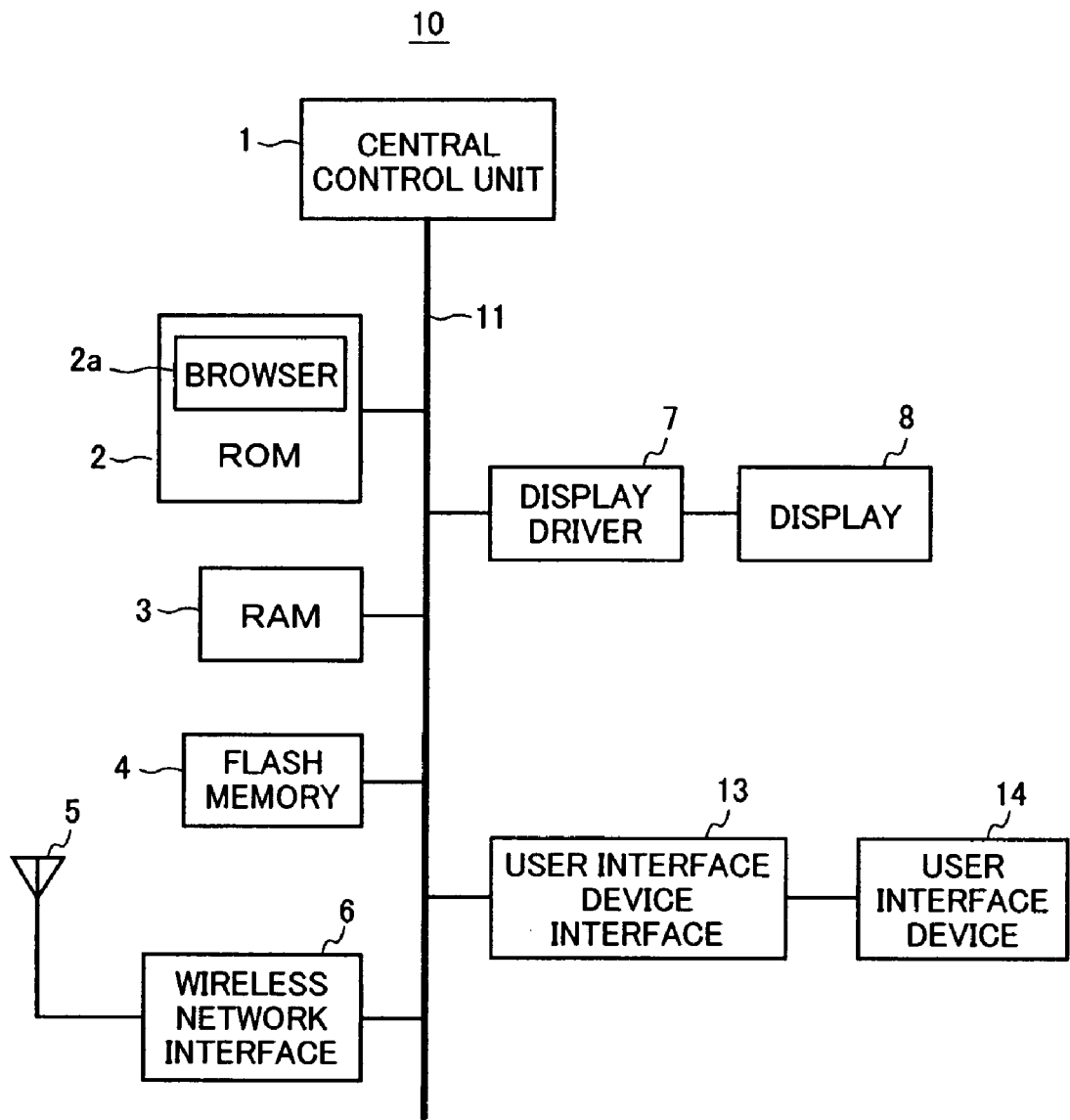
FIG. 3 is a block diagram showing an example of the hardware configuration of the mobile phone shown in FIGS. 1 (a), (b)

FIG. 3 is a diagram showing an example of the hardware configuration of the mobile phone 10. The mobile phone 10 is controlled by the program executed in a central control unit (for example, CPU) 1. A ROM 2 is usually a read-only memory in which the control program, pre-installed application programs, and fixed data are stored. A RAM 3 is a read/write memory that provides a data temporary saving area or a work area. A flash memory 4 is a rewritable memory in which various types of data are stored in a non-volatile manner as described above. A browser 2a is stored in the ROM 2 (it may also be stored in the flash memory 4). A wireless network interface 6 is a part where voice and data wireless communication with a base station is performed via an antenna 5. A display driver 7, controlled by the central control unit 1, performs drawing processing for various types of information and displays information on the display screen of the display 8 that is the display unit. A user interface device interface (I/F) 13 is a part that performs the input/output operation of a user interface device 14, such as the key operation unit including various operation keys, the microphone, and the speaker, under control of the central control unit 1. In addition to those components, the mobile phone 10 may have a broadcast receiver unit, not shown, that receives a ground wave data broadcast.

Figure 12:
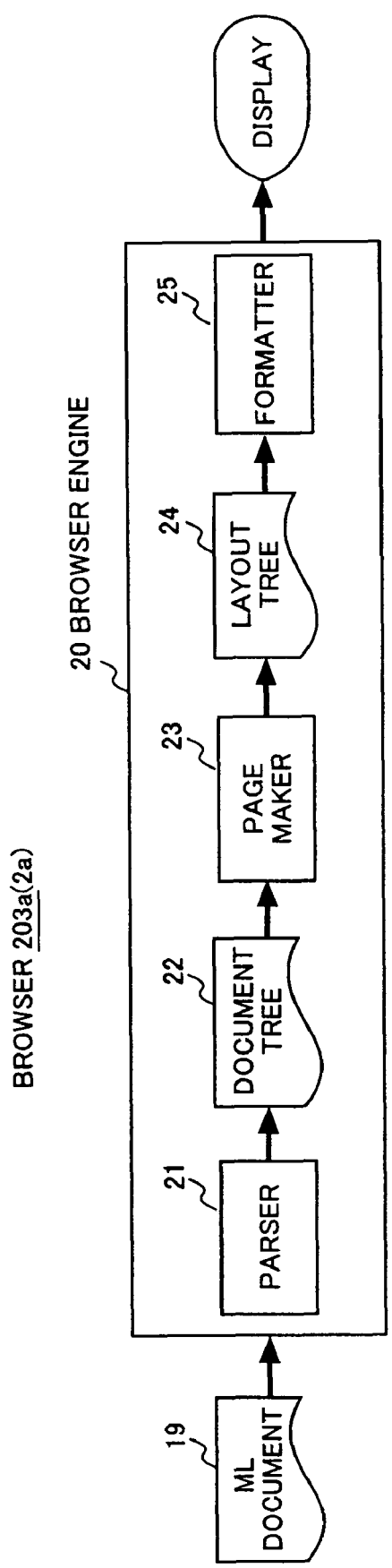
FIG. 12 is a functional block diagram showing the general configuration of a browser.

Now, with reference to FIG. 12, the following describes the general configuration of the browser 203a (or 2a). The browser 203a (or 2a) has a browser engine 20 as its main functional unit. The browser engine 20 comprises the functional blocks such as a parser 21, a page maker 23, and a formatter 25. The parser 21 interprets the logical structure of a markup language (ML) document 19 to be displayed and generates a document tree 22 of the structure. Based on the document tree 22, the page maker 23 generates a layout tree 24 that includes information on the representation format (block, inline, table, list, item, etc.) defined by the tags. This layout tree 24 represents in which order the representation formats (block, inline, table, etc.) appear. However, the layout tree 24 does not include the layout information such as the onscreen position, width, and height of the elements and the character wrap position. The formatter 25 lays out the information based on the layout tree 24 using the information on the actual display screen such as the known display screen width. That is, the formatter 25 arranges the layout tree 24 on the actual display screen and determines the character wrap position, the onscreen position, the width, and the height. After the browser engine 20 performs this processing, the markup language document 19 is displayed on the display screen.

A "document described in the markup language" (markup language document 19) is a text document before being analyzed by the browser. To distinguish between this markup language document 19 and the result generated by analyzing and rendering the markup language document, the latter is called an "in-frame document" in this specification for convenience. The term "focus item" refers to an onscreen link to be focused that is in an in-frame document displayed in a frame.

Figure 4:
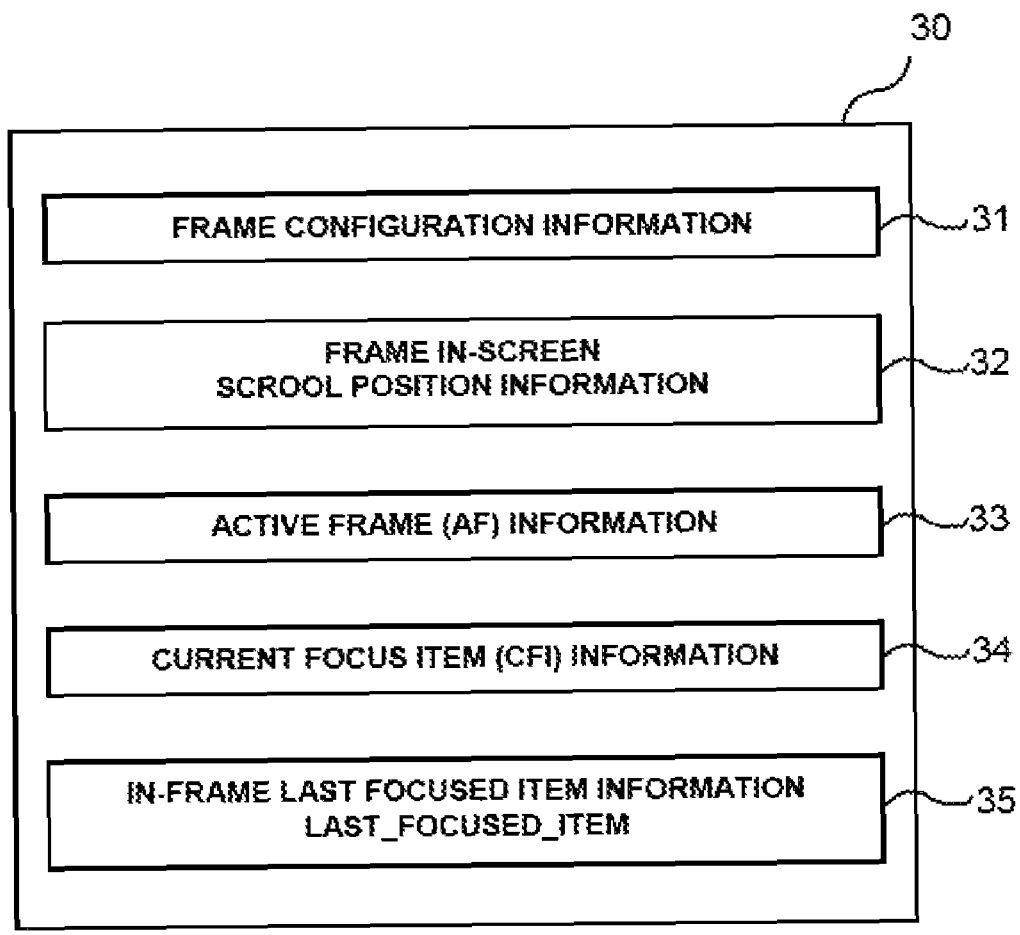
FIG. 4 is a diagram showing the various parameters used by or stored in a markup language document processing device in an embodiment of the present invention.

FIG. 4 shows various parameters 30 used by, or stored in the markup language document processing device in this embodiment. Frame configuration information 31 is information that defines the position and size of a frame. The frame configuration depends on the specification of the display device and the content of the markup language document. The markup language document may be any document obtained via communication or a broadcast, or from a storage medium. The number of frames depends on the markup language document to be displayed. In-screen scroll position information 32 for each frame is information on the scroll position (or scroll amount) of an in-frame document currently displayed in each frame. Active frame (AF) information 33 is information that indicates the frame ID (frameID) of a current active frame. "Frame ID information" is information that identifies each of plural frames on the screen. Current focus item (CFI: Current Focus Item) information 34 is focus item identification information that identifies the currently focused focus item. The "focus item identification information" is information that uniquely identifies a focus item in each markup language document, for example, a serial number. In-frame last focused item ("last_focused_item") information 35 is identification information on the last focused focus item stored for the in-frame document currently displayed. The abbreviations for the above parameters are assigned for convenience.

The following describes the effect and the operation of this embodiment more in detail.

FIGS. 5A(a)-(f) are diagrams showing an example of the display screen that show an example of the typical operation in this embodiment. In this example, assume that a display screen 40 has two frames 41 and 42 and that the user can use the focus movement operation means to give an instruction to move the focus in four directions, up, down, left, and right. The items "A", "B", "C", "D", "E", and "F" in the frames show the onscreen links that are focus items 44-49. Assume that the first focus item 44 in the frame 41 is focused now (a). Although a focus 43 is shown by a frame around a focus item in the figure, any other emphasized display such as a highlighted display may be used. When a focus movement instruction is given by the focus movement operation means, the focus 43 moves among the plural focus items, that exist in one frame, according to a predetermined rule. In this embodiment, when a down key 75b is pressed in the state in FIG. 5A(a), the focus 43 moves to the focus item "B" (b). Next, when a right key 75d is pressed, there is no focus item to the right of the focus item "B" in the frame 41 but there is another frame 42. In such a case, the focus moves across the frame border to another frame (frame 42 in this case) (c). In this case, the focus item that is last focused ("B" in this case) is stored as the in-frame last focused item for the frame 41.

Any method may be used to move the focus among plural focus items in one frame. For example, a known technique for giving a four-directional (up, down, left, and right) focus movement instruction is disclosed in International Publication WO98/12871 pamphlet and Japanese Patent Laid-Open Publication No. Hei 10-171842. A bi-directional (up and down) focus movement instruction, in which the focus moves among all focus items in a frame in a predetermined order by means of the tab key or shift key, is known and used in a browser for a personal computer.

When the focus moves to another frame for the first time, the focus moves to a predetermined focus item within the frame determined according to the predetermined rule. The predetermined focus item within the frame determined according to the predetermined rule is, for example, the first focus item of the plural focus items that appear in the frame display area or the focus item displayed nearest to the focus item from which the focus moves.

When the focus moves to the focus item "D" and, after that, the user presses the down key 75b twice in the example shown in FIGS. 5A(a)-(f), the focus moves first to the focus item "E" and then to the focus item "F" ((d)-(e)). When the user presses a left key 75c in this state, the focus moves across the frame border and moves to the original frame 41 (f). In this case, the focus moves to the focus item "B" because, for the frame 41, the focus item "B" is stored as the in-frame last focused item.

In the example in FIGS. 5A(a)-(f), if the user tries to move the focus from one focus item to another into one direction in a frame but there is no focus item, to which the focus is to move, in the specified direction in the same frame and there is another frame in the specified direction, it is assumed that the focus moves to that another frame. However, "another frame" is not limited to the frame in the specified direction but, if there is no other frame in the specified direction, "another frame" may be a frame (if any) on the end side of the screen opposite to the end in the specified direction. For example, when the user tries to move the focus to the left from a focus item in the frame 41, the focus can be moved to the frame 42 that is on the side in the direction opposite to the specified direction. If there is no frame in both the specified movement direction and the opposite direction, the focus may also be moved to the direction orthogonal to the specified direction (direction determined by the predetermined rule). In such a case, because the user can change the direction in which the focus is to move, it is of course possible not to accept the operation to move the focus in which there is no other frame.

FIGS. 5A(a)-(f) shows a case in which, after the focus 43 moves to the focus item "B", the focus 43 moves to the neighboring frame 42 without pressing the enter key or in which the display content of the frame 42 remains unchanged even when the enter key is pressed.

FIGS. 5B(a)-(f) show a case in which the display content of the frame 42 changes (that is, new focus items "G" 47*a*, "H" 48*a*, and "I" 49*a* appear) when the user presses the enter key with the focus 43 on the focus item "B" (b). Although the focus 43 remains in the frame 41 in this case, it is also possible to move the focus 43 automatically from the focus item 45 in the frame 41 to the focus item 47*a* in the frame 42 (*c*). The last focused item (45 in the figure), on which the focus 43 was displayed in the immediately previous frame, is highlighted in a format different from that of the focus (reversed in the example in the figure). This highlighting allows the user to identify the focus item on which the focus was displayed (or which was determined) in the immediately previous frame even when the focus 43 moves from one from to another. When the focus 43 returns from the frame 42 to the original frame 41, the focus 43 returns to the last focused item "B" 45 as in the case shown in FIGS. 5A(a)-(f).

Figure 13:
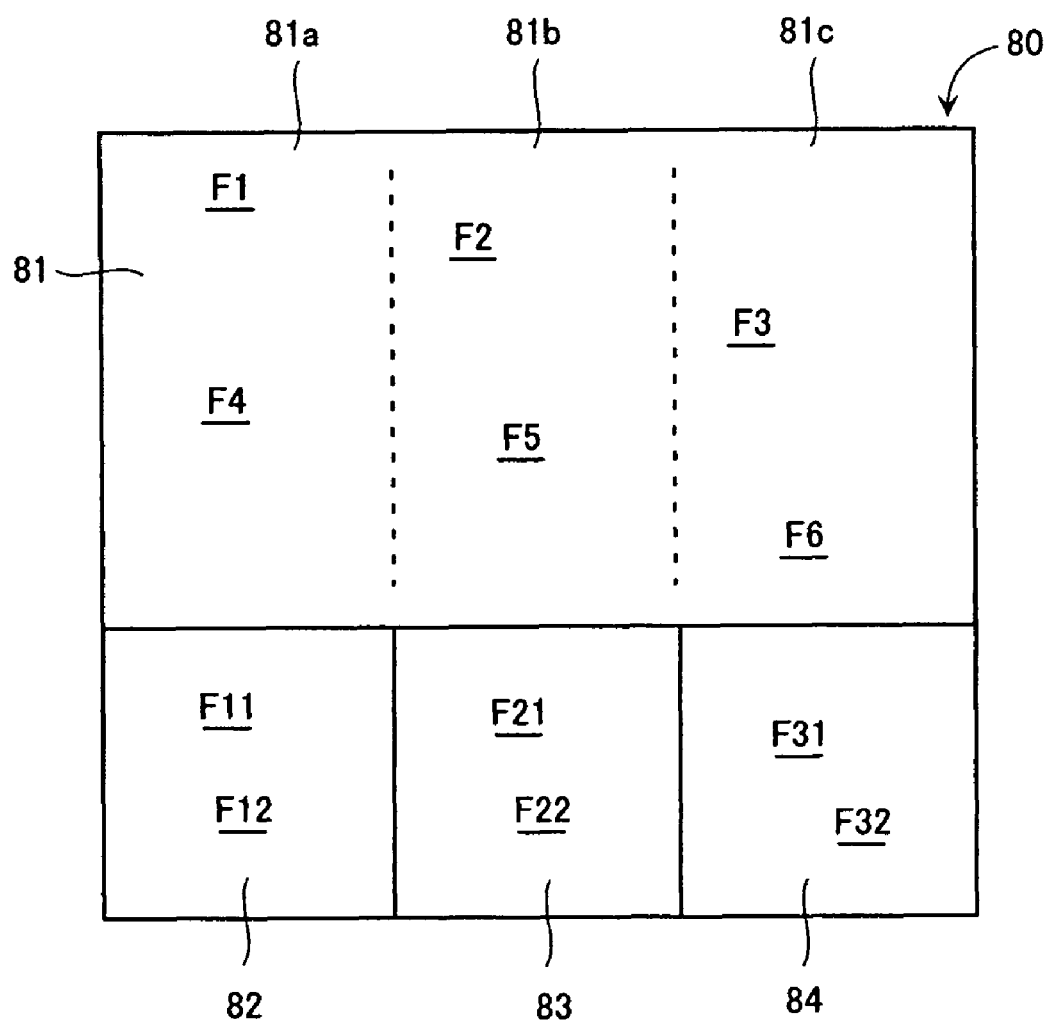
FIG. 13 is a diagram showing an example of focus movement in one frame in the embodiment of the present invention.

Now, with reference to FIG. 13, the following describes the meaning of the expression "there is no focus item, to which the focus is to move, in the specified direction in the same frame" mentioned above FIG. 13 shows an example in which a screen 80 has four frames 81-84. As an example of a predetermined focus movement rule that is applied to a focus movement instruction in the frame 81, the figure shows the rule that limits the movement of the focus to one of sub-areas 81*a*, 81*b*, and 81*c* created by dividing the frame 81. For example, when the user presses the down key with the focus on a focus item F1 in the sub-area 81*a*, the focus moves to a focus item F4 appearing below in the sub-area 81*a*. Although there are focus items F2 and F3 below the focus item F1 in the whole frame 81, those focus items are outside the sub-area 81*a* and, therefore, are not "the focus items to which the focus is to move" in the specified direction. In addition, when the user presses the down key with the focus on the focus item F4, there is no "focus item to which the focus is to move". Although there are focus items F5 and F6 below the focus item F4 in the whole frame 81, they are outside the sub-area 81*a* as in the example above. Note that the user can press the right key to move the focus from the sub-area 81*a* to the sub-area 81*b*.

The predetermined focus movement rule is not limited to the one described above; instead, for each focus item of each markup language document, the rule may define the next focus item to which the focus is to move within the frame in the specified focus movement direction. In this case, no "next focus item" corresponds to the case in which "there is no focus item to which the focus is to move". As described above, the expression "there is no focus item to which the focus is to move" refers to the state in which there is no focus item to which the focus is to move according to the predetermined rule but does not necessarily refer to the state indicating the presence or absence of focus items on the display screen.

Figure 6A:
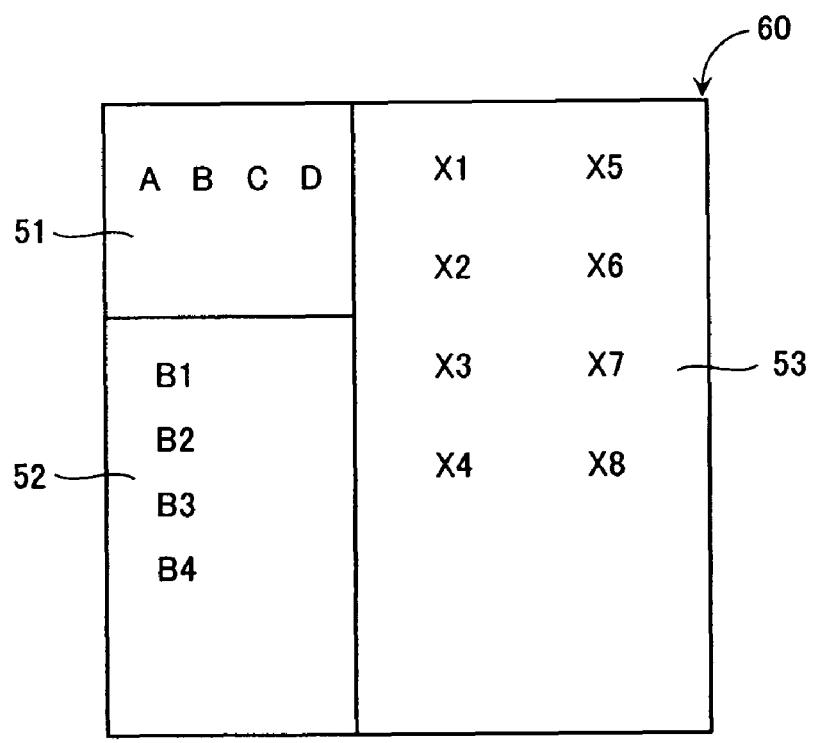
FIGS. 6(a) and (b) are diagrams showing examples of a display screen which has three frames.
Figure 6B:
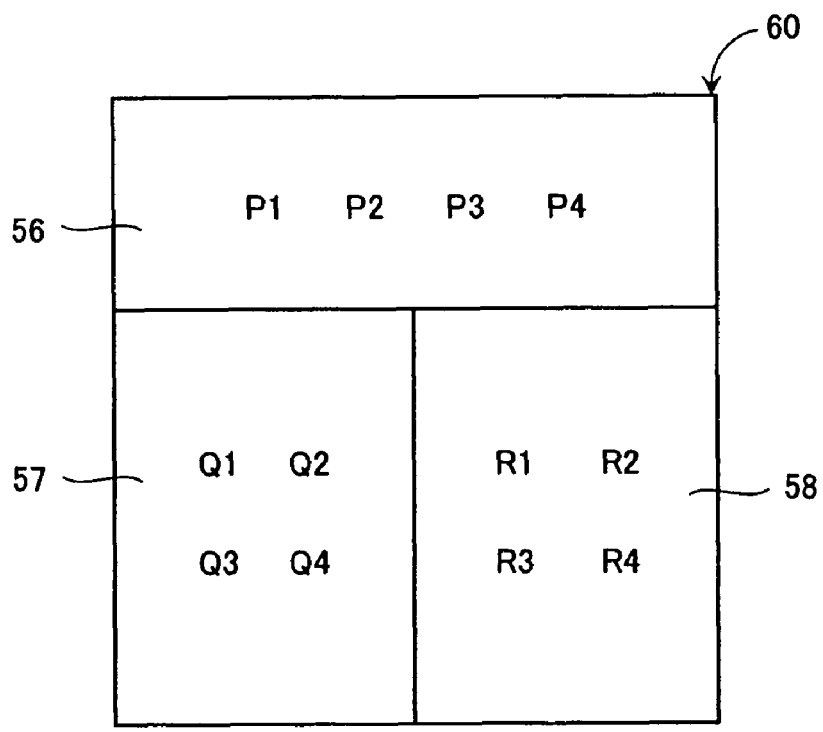

The focus movement control across frame borders can be performed regardless of the number of frames or the arrangement of frames. For example, the focus can be moved across frame borders in the same way when there are three frames 51, 52, and 53 or four or more frames in a screen 60 as shown in FIGS. 6(*a*) and (*b*). When the focus items are arranged two-dimensionally in the frame as in the frame 53 in FIG. 6(*a*), the focus can be moved in the up, down, left, and right directions through the focus movement operation by means of the pointing keys 75. If the pointing keys 75 and its associated processing support the oblique movement of the focus, the user can move the focus obliquely. In the example in FIG. 6(*b*), if the user specifies the downward operation by means of the pointing key 75 from any focus item (P1-P4) in a frame 56 on the screen 60, there are plural frames 57 and 58, arranged in parallel, in that direction. When plural frames are arranged in parallel in the specified direction in this way, the destination frame is determined according to a predetermined rule. The predetermined rule is that (1) the leftmost (or rightmost) frame on the screen is selected when the frames are arranged horizontally, (2) the top frame is selected when the frames are arranged vertically, and (3) the frame nearest to the position of the currently focused item in the specified direction is selected. For example, consider the example in FIG. 6 (*b*) in which focus item P4 in the frame 56 is focused. In this case, when the user presses the down button to move the focus downward, the focus moves to the frame 57 according to rule (1) and to the frame 58 according to rule (3). The focus moves to the frame in frame arrangement order according to rules (1) and (2), while the focus moves to the visually intuitive frame according to rule (3). The rule to be used may be predetermined in advance or may be selected by the user during the initialization.

It is one thing for the focus to move from one frame to which frame next but it is quite another to move to which focus item in that frame. Although four-directional focus movement in one frame is assumed in the above description, bi-directional focus movement (for example, up and down) is also possible to reach all focus items. When bi-directional focus movement is used, the focus also moves among focus items according to a predetermined rule and, if there is no focus item to which the focus is to move next according to the rule, the focus moves to some other frame. For example, in the example of the screen shown in FIG. 13, when the user presses the down key in the frame 81 with focus on the focus item F1, the focus moves in order of F1, F2, F3, F4, F5, and F6 or in order of F1, F4, F2, F5, F3, and F6. The focus moves from the last focused item in this order to some other frame. Which of frames 82, 83, and 84 is "some other frame" depends on the predetermined rule described above. The order of movement is not limited to those described above but any order may be used as long as a predetermined rule is followed.

Figures 7A, 7B:
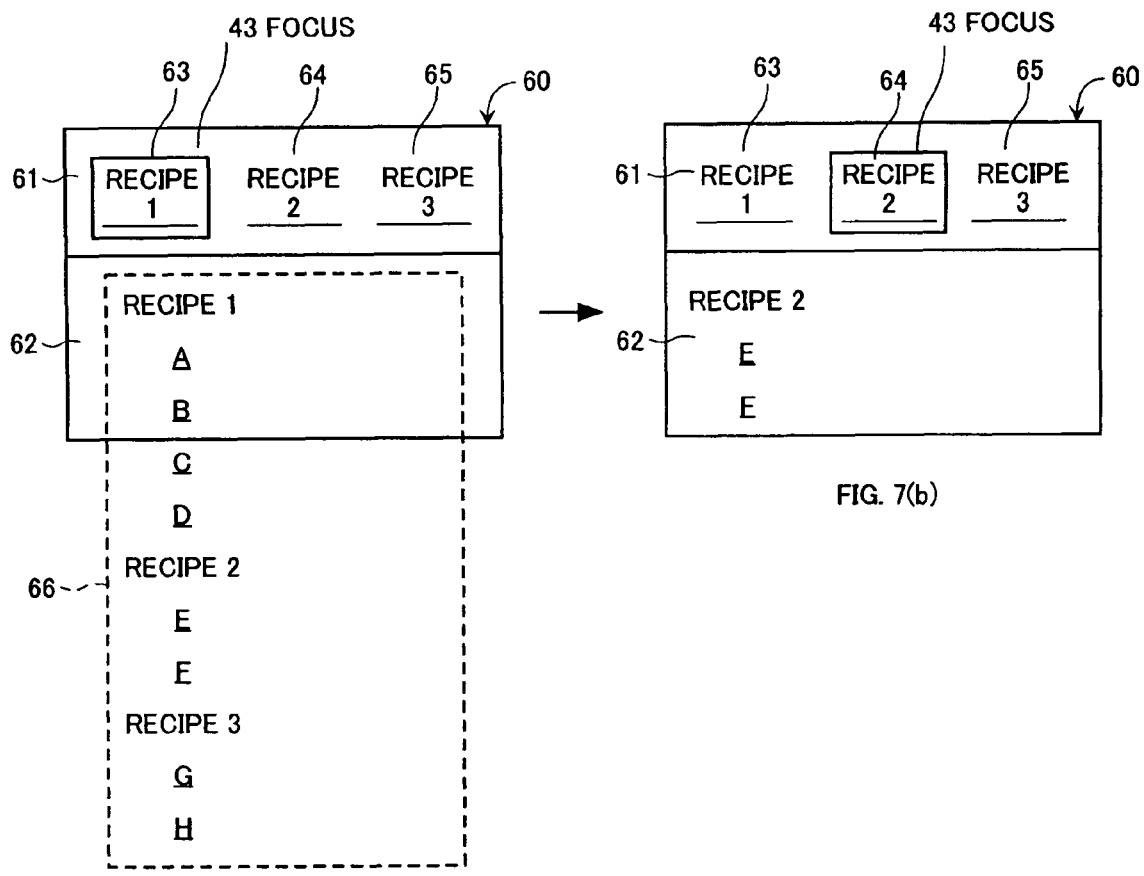
FIGS. 7(a) and (b) are diagrams showing a typical specific example of focus movement control in the embodiment of the present invention.

FIGS. 7(*a*) and (*b*) show a typical actual example in this embodiment in which focus movement control is achieved by the browser program 203*a* (or 2*a*). FIGS. 7(*a*) and (*b*) show an example of the screen 60 that has two frames 61 and 62 arranged vertically. The top frame 61 is a menu screen where, in this example, plural recipe numbers in a recipe book are displayed as focus items 63, 64, and 65 that are onscreen links.

In the example in FIG. 7(*a*), the user presses the enter key 76 with the focus on the focus item 63 ("recipe 1" menu item) in the frame 61 and, as a result, the content of "recipe 1" is displayed in the frame 62. (Initially, the content of "recipe 1" is displayed in the frame 62 as shown in the figure even if the user does not press the enter key 76). The character strings "recipe 1", "recipe 2", etc. in the frame 62 correspond to the jump destinations of the focus items 63, 64, etc. that are recipe numbers called anchor names in HTML, and the frame 62 is specified as the target frame in which the information is displayed. When the user moves the focus downward from the focus item 63 in the frame 61, the focus moves to the first focus item ("A") in the frame 62 (in this case, assume that the last focused item is not stored for the frame 62). A document 66 in the frame 62, which is longer than is wide, does not fit in the display area of the frame 62 in its entirety and, therefore, the display area is vertically scrollable. That is, to move the focus downward from the focus item "A" to a focus item outside the display area, the screen in that frame is scrolled so that the focus item appears in the display area.

To return to the frame 61 after browsing the frame 62, the user moves the focus 43 upward and, when it reaches the focus item "A", further moves the focus upward to cause the focus 43 to move into the frame 61 across the frame border. At this time, because the focus item 63 is stored as the last focused item of the frame 61, the focus 43 moves onto the focus item 63. The focus item "A" is also stored as the last focused focus item of the frame 62.

Although not shown in the figure, the focus item, on which the focus 43 was placed last (or confirmed) in the frame 61 before the focus 43 moved from the frame 61 to the frame 62, may be highlighted as shown in FIGS. 5B(*a*)-(*f*) (for example, displayed in reverse as hi the above example).

Next, when the user moves the focus from the focus item 63 to the focus item 64 ("recipe 2" menu item) and presses the enter key 76 in the frame 61, the recipe 2 part of the document 66 appears in the frame 62 in the display area of the frame 62 as shown in FIG. 7(*b*). In this case, the last focused item stored for the frame 62 is the focus item "A". However, this focus item "A" is not currently in the frame 62. So, when the user moves the focus from the frame 61 to the frame 62 through the focus movement operation, the focus moves onto the focus item (the first focus item "E" in this example) that is displayed in the display area and determined according to the predetermined rule as the current focus item in the frame 62. After browsing the frame 62, the user moves the focus 43 upward again and, when the focus reaches the frame border, the user further moves the focus upward to cause the focus to cross the frame border. In this case, the focus 43 returns to the focus item 64 that is stored for the destination frame 61.

As described above, when the user who browses a frame-structured document moves the focus from one frame to another and then returns the focus back to the former frame, there is no problem with a device that has the direct pointing means, such as a mouse, for directly pointing a focus item. However, when the user moves the focus among frames on a device that has no such direct pointing means, the inventors of the present invention have reached the conclusion that, with the aim of reducing the number of user operations, it is preferable that the focus return to the last focused (or determined) focus item in the former frame from which the focus moved. That is, when the focus returns from the screen of recipe 2 in the frame 62 to the menu screen in the frame 61 in the example in FIGS. 7(*a*) and (*b*), the focus returns to the focus item 64 last focused in the frame 61. From there, the focus can immediately move to the next focus item 65 or return to the previous focus item 63. If this control method were not used when the focus returns to the former frame but, instead, the focus always returns to the fixed (for example, the first) focus item, more operation steps would be required on average to move the focus to the desired focus item.

As shown in the example in FIGS. 7(*a*) and (*b*), if the in-frame screen of a frame (frame 62 in this example) is too large to require scrolling or if there are so many focus items that many other focus items must be run over before reaching the frame border, the user must perform many focus movement operations (or time-consuming focus movement operation) to move the focus among frames even if the user can move the focus across the frame border. To solve this problem, this embodiment provides a frame switching key 77 to switch the active frame among frames. Each time the user presses this frame switching key 77, the active frame is switched among frames sequentially and cyclically. The frame-to-frame movement of the focus by means of the focus movement operation of the present invention, combined with the active frame switching by means of the frame switching key 77, can compensate for the insufficient operability of the former.

Instead of, or in addition to, the frame switching key 77, a plurality of frame-switching keys may also be provided. With correspondence established between the plural frame-switching keys and the frames, a specific frame-switching key, if pressed, activates the corresponding frame. Another modification of the plural frame-switching keys is a specific mode-switching key (one of the keys shown in the figure) that is pressed to make the color buttons 70*a*-70*d* available for frame switching. Because there are four color buttons 70*a*-70*d* in this example, the active frame can be switched among up to four frames.

When the active frame is switched by the frame switching key 77 or the like, the focus is put on the last focused item in the newly-activated frame if such a focus item is stored in the new frame.

In some cases, the last focused item stored for the destination frame is outside the display area of that frame. In such a case, the last focused item that is stored is reset, a focus item in the display area determined according to the predetermined rule (first focus item in this case) is set as the last focused item and, at the same time, the focus is moved to the new last focused item. For example, when the focus is moved from "recipe 1" to "recipe 2" in the frame 61 in the example shown in FIGS. 7(*a*) and (*b*) and the enter key 76 is pressed, the screen in the frame 62 is automatically scrolled so that the recipe 2 part of the in-frame document 66 is displayed at the top of the display area of the frame 62. When the focus moves to the frame 62 for the first time, the last focused item of the frame is the default focus item (the top focus item of the document and, in FIGS. 7(*a*) and (*b*), the focus item "A"). If the focus is moved to the frame 62 through the focus movement operation in this state, the display returns to "recipe 1" though the content of "recipe 2" is displayed at the top in the frame 62. This is inconvenient. To solve this problem, if the last focused item stored for a destination frame is outside the display area of that frame, the focus is moved in this embodiment to the focus item displayed at the top in the display area.

An operation key 78 (FIGS. 1(*a*), (*b*)) may also be provided to cause the focus in a frame to move (jump) directly to a focus item in the frame display area determined according to the predetermined rule (for example, the first focus item). Even when the focus is on one of the focus items in the tail part of the frame display area, this operation key allows the focus to move immediately to the first focus item in the display area by skipping over the intervening focus items during the focus Movement operation.

Figure 8:
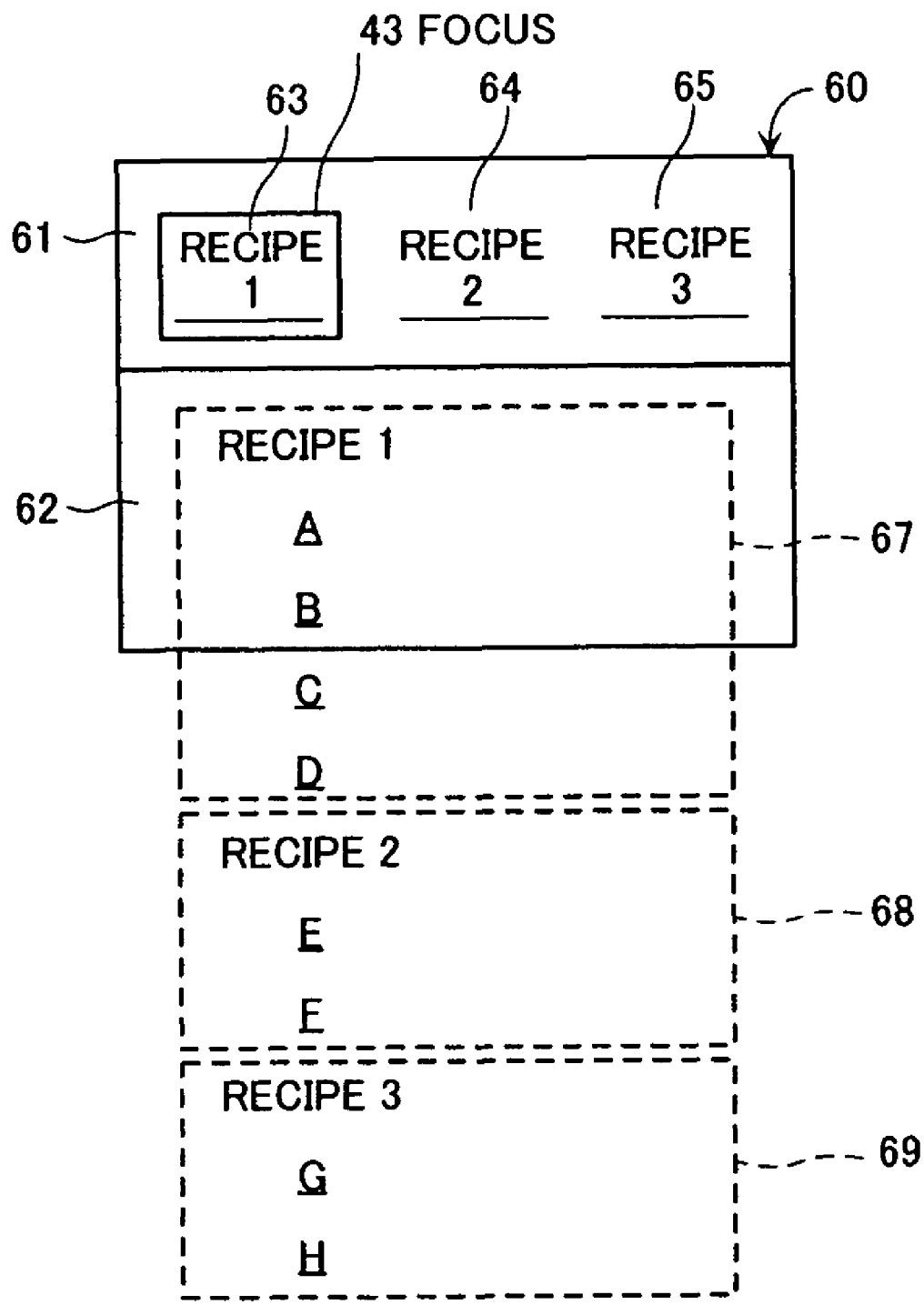
FIG. 8 is a diagram showing another typical specific example of focus movement control in the embodiment of the present invention.

In the example in FIGS. 7(*a*) and (*b*), the link destinations of the focus items in the frame 61 are the items located in different positions in the document in the frame 62. Instead, the link destinations of the focus items may also be in different documents. FIG. 8 shows an example in which plural in-frame documents 67, 68, and 69 are switched and displayed in the frame 62 in response to an instruction to select from the focus items 63, 64, and 65 in the frame 61. In this case, for the frame 62, when the focus moves from that frame to some other frame, the last focused focus item for each in-frame document once displayed in the frame 62 is stored. In this embodiment, even if plural in-frame documents are displayed in the same frame, the last in-frame focused item of only the currently displayed in-frame document is stored. Instead of this, it is also possible to store the last focused items for all in-frame documents that are once displayed. In this case, the variable "last_focused_item" is changed to the in-frame document last focused item "last_focused_item (framedocID)" information, which is an array variable with the in-frame document identification information framedocID as the parameter, so that the last focused item for each in-frame document is stored. Similarly, for each in-frame document whose frame-by-frame in-screen scroll position information 32 is changed to the "in-frame document in-screen scroll position information", the in-screen scroll position is stored. In this case, the information indicating the in-frame document ID (framedocID) of the current active in-frame document is also managed as "frame-by-frame active in-frame document (AFD) information".

Figure 9:
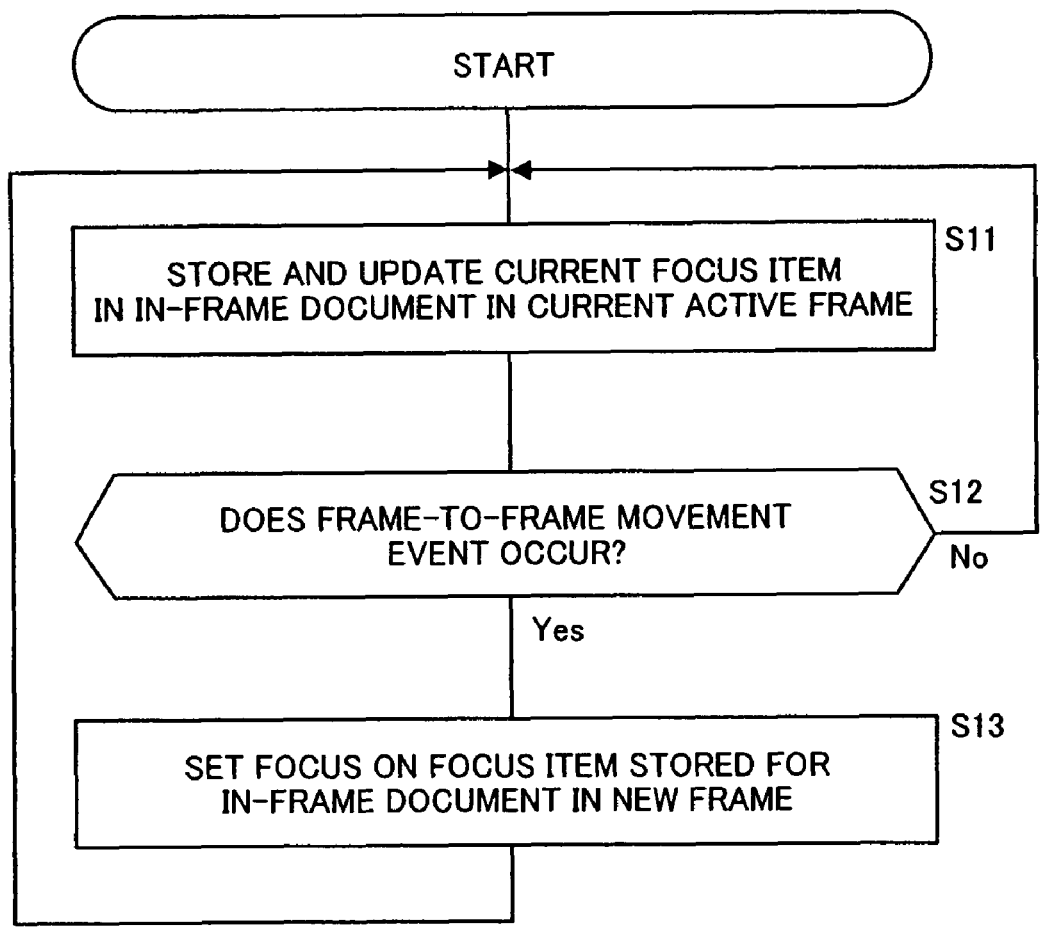
FIG. 9 is a flowchart showing the general flow of focus movement control of a browser in the embodiment of the present invention.

FIG. 9 shows the general flow of the focus movement control of a browser in this embodiment.

The browser stores the current focus position (which focus item is being focused) in an in-frame document in the current active frame and updates the position according to the focus movement operation performed by the user (S11). When the user presses one of the pointing keys 75 as described above to move the focus across the frame border or when the user presses the frame switching key 77, the browser determines that a frame movement event occurs (S12, Yes), identifies the in-frame document of the new destination frame, and moves the focus to the focus item specified by the last focused item information stored for that in-frame document (S13). The default (initial value) of the last focused item in this embodiment is the first focus item in an in-frame document.

Figure 10:
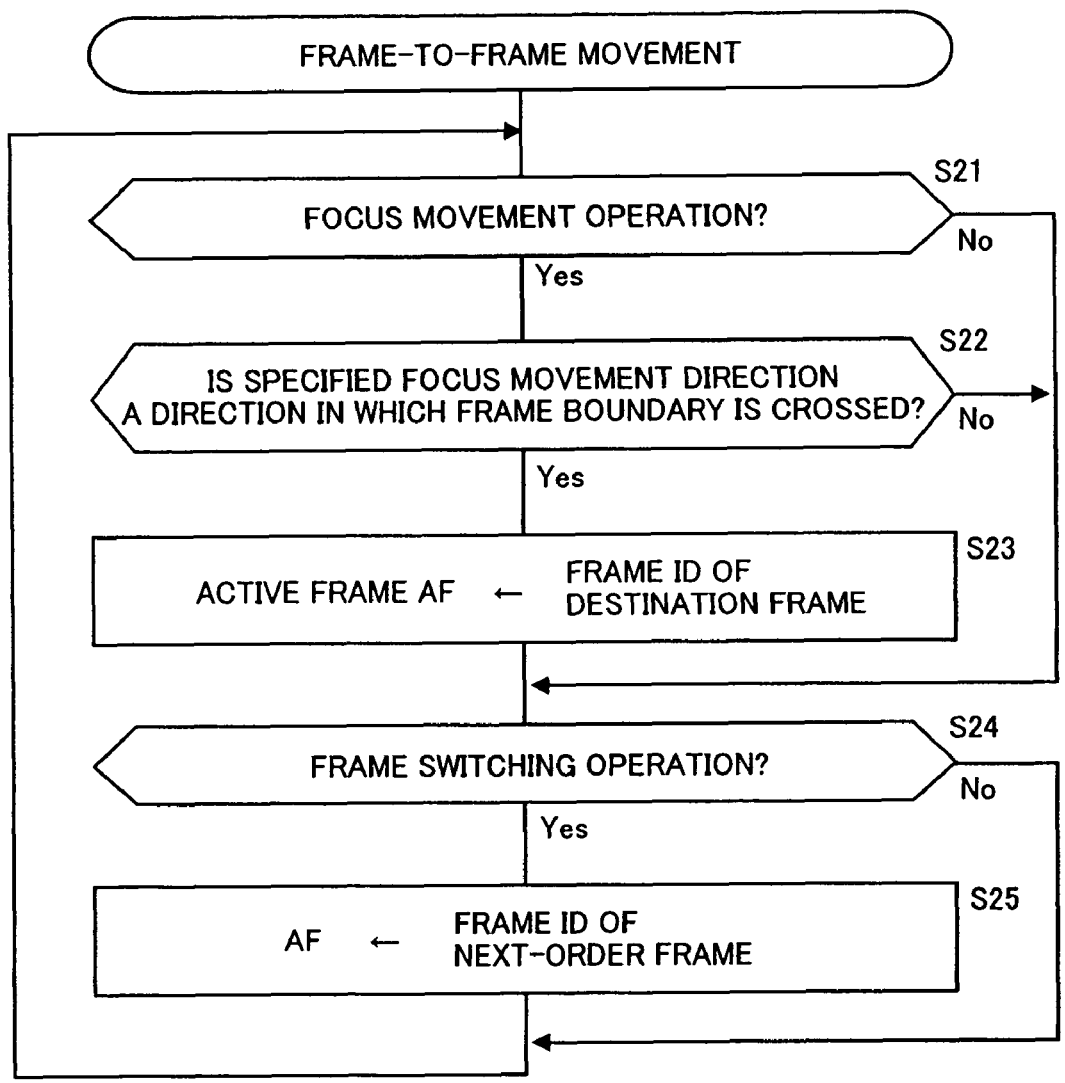
FIG. 10 is a flowchart showing an example of frame-to-frame movement in step S12 in FIG. 9.

FIG. 10 shows an example of the frame-to-frame movement processing in step S12 in FIG. 9. A check is made if the user presses one of the pointing keys 75 to move the focus (S21). If the user performs the focus movement operation (S21, Yes), the specified focus movement direction is checked (S22). If there is no focus item in that direction but there is some other frame (S22, Yes), it is determined that the user wants to move the focus across the frame border. In this case, the frame ID of the other frame is set in the "active frame (AF) information" 33 (S23).

If a frame switching instruction is given by means of the frame switching key 77 or the like described above (S24, Yes), the frame ID of the next frame is set in the "active frame (AF) information" 33 (S25).

Figure 11:
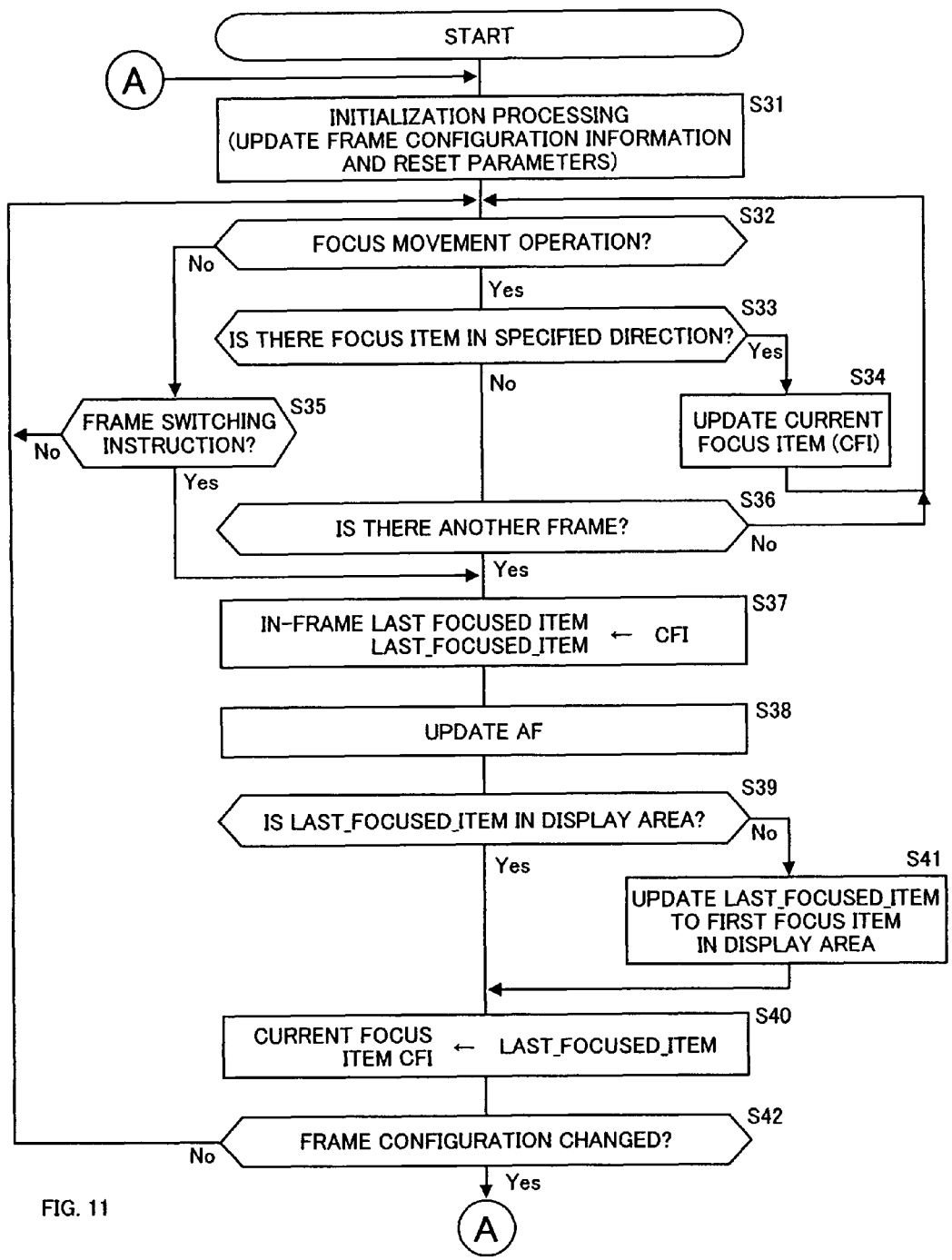
FIG. 11 is a flowchart showing the flow of specific focus movement control in the present invention of the present invention.

FIG. 11 shows a more specific focus movement control flow. This processing is started when a frame based on the markup language is displayed.

First, the predetermined initial processing is performed (S31). During this initial processing, the definition information such as the frame configuration information 31 is set (or updated) and the parameters (information 32, 33, 34, 35, etc. in FIG. 4) are reset.

Next, a check is made if the user presses one of the pointing keys 75 to move the focus (S32). If the user moves the focus, a check is made if there is a focus item in the specified movement direction (S33). If there is such a focus item, the current focus item (CFI:current_foucsed_item) in the current active frame is updated (S34). When the focus moves to a focus item in the display area in the frame, the screen is scrolled in the frame as necessary and the frame-by-frame in-screen scroll position information 32 is updated. If the focus is not moved in step S32 but a frame switching instruction is given (S35, Yes), control is passed to step S37; if the frame switching instruction is not given, control is passed back to step S32.

If there is no focus item in the specified movement direction but there is another frame (S36, Yes), the in-frame last focused item(last_focused_item) is set with the current focus item (CFI) (S37) and, after that, the active frame (AF) information 33 is updated (S38). That is, the AF information 33 is set with the frame ID of the frame to which the focus is moved.

Next, the position of the in-frame last focused item (last_focused_item) and the frame-by-frame in-screen scroll position information 32 of the in-frame document displayed in the frame that is the new active frame are compared with the frame configuration information 31 to check if the focus item is in the display area of the frame (S39).

If the focus item is in the display area, the current focus item CFI is set with the in-frame last focused item information 35 of the active frame (S40). If the focus is outside the display area, the current last focused item of the active frame is updated to the first focus item in the display area of the frame (S41) and control is passed to step S42. The first focus item in the display area can be determined by referencing the current frame-by-frame in-screen scroll position information 32.

After step S40, control is passed back to step S32 if the frame configuration is not changed. The frame configuration is generated when a new markup language document, which will be displayed on the whole screen or in some frames, is read. If the frame configuration is changed, control is passed back to step S31 that is the first step. If only some frames are changed, it is possible not to initialize the parameters of the unchanged frames but to use their current values.

In the above description, when the focus moves to another frame, the focus moves to the focus item stored for the destination frame. Instead, it is also possible to move the focus to the next-order focus item of the focus item that is stored (determined by the serial number). To do so, when control is passed from step S39 to step S40 in FIG. 11, the next-order focus item of the in-frame last focused item should be set as the current focus item (CFI). As described in FIGS. 7(*a*) and (*b*), when the user selects a menu item and jumps to the link destination (in some other frame) and then returns to the former frame, it is likely that the user selects the next-order focus item. This modification is useful in such a case.

It should be noted that the focus movement control to be used depends on the situation. Therefore, it is also possible to provide two separate operation modes, that is, the mode of the embodiment described above in which the focus returns to the last focused item and the mode of the modification in which the focus returns to the next-order focus item of the last focused item, so that the user can select one of the operation modes. The mode, in which the focus always returns to the fixed focus item (for example, the top focus item), may also be added to the operation modes described above.

Figure 14A:
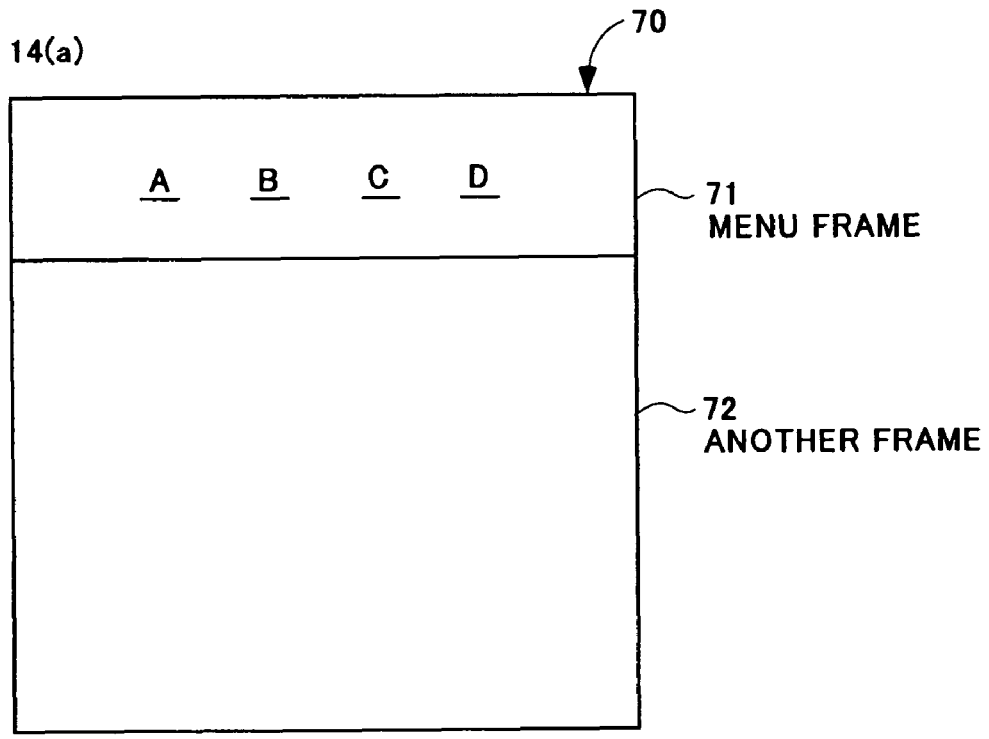
FIGS. 14 (a) and (b) are diagrams showing menu frames that are examples of specific types of frame in the embodiment of the present invention.
Figure 14B:
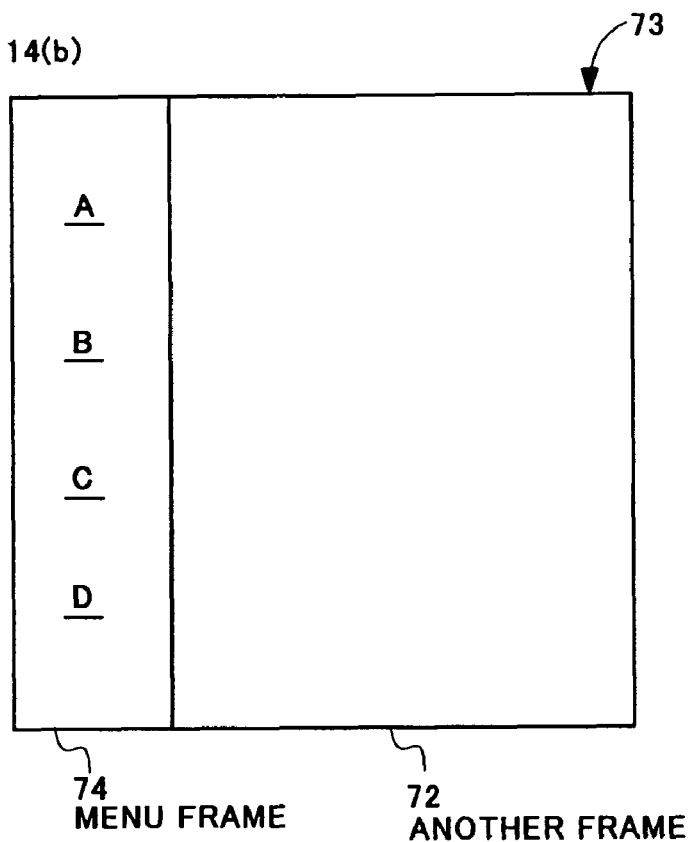

In the description above, when the focus crosses the frame border and, after that, returns to the former frame, it is assumed that the focus movement according to the present invention is performed with no particular consideration for the type of frame. However, such a particular focus movement may be limited to a specific type of frame. For example, FIG. 14(*a*) shows an example of a screen 70 having two menu frames: a menu frame that is a specific type of frame where menu items are displayed and another frame 72 where the content of a selected menu item is displayed. On this screen 70, the last focused position is stored when the focus 43 moves from a menu frame 71 to the other frame 72 but, conversely, when the focus 43 moves from the other frame 72 to the menu frame 71, the last focused position is not stored. This movement method eliminates the need for the exceptional treatment (the focus moves to the focus item that appears in the focus destination frame and that is predetermined by the rule) that is performed when the stored focus item does not appear in the current frame as described in FIGS. 7(a) and (b). The menu frame may be a landscape-type menu frame 71 as shown in FIG. 14(a) or a portrait-type menu frame 74 as shown in FIG. 14(b). There is not always one other frame 72 but there may be two or more.

Whether a given frame is a menu frame or not is determined based on the following predetermined conditions.

(1) Determination based on the file name of a file displayed in the frame

The frame is determined as a menu frame when the filename contains a specific character string (for example, "menu"), (2) Determination based on the value of the name attribute of the FRAME tag The frame is determined as a menu frame when the attribute value contains a specific character string (for example, "menu").

(3) Determination based on the target attribute

The frame is determined as a menu frame when the target attribute specified for the anchor (A) tag in the frame indicates a menu.

(4) Determination based on the ratio of the area of the frame to the area of the screen to which the frame belongs.

For example, the height is about 15% of that of the screen when the width of the frame is equal to that of the screen.

The width is about 15% of that of the screen when the height of the frame is equal to that of the screen.

(5) Determination based on the relation between the anchor point and its target frame The frame containing plural anchor points is determined as an a menu frame when the target frames of the display destinations of those anchor points, included in the content displayed in that particular frame, are set in other frames in the same display screen where the frame is displayed.

The determination condition described above may be customized according to the requirements of a terminal (or a service). Some services may disclose the determination condition for use as a guide for creating contents.

The "mode of the modification in which the focus returns to the next-order focus item of the last focused item" described above can be further extended to the "next-order focus position estimation (movement)" function. That is, the expression "next-order" included in the above description means the "next" determined according to the order of anchor tags appearing in the markup language document, and the expression "next-order" in this embodiment also includes the following modifications. These modifications are useful when a focus item that is used as the next-order candidate and a focus item that is not the candidate are mixed in a frame. The method for determining the "next-order" is not limited to a menu frame described above.

(a) For example, when plural focus items in a frame are grouped into plural blocks, the first focus item of each block is the candidate and the next-order focus item is determined from those focus items.

(b) The anchor tags to which specific names are assigned are excluded from the next-order focus items.

Rule information is registered in advance for a predetermined (or user-registered) page, and the rule information corresponding to the page is selected for application.

(d) When the target frame of the last stored anchor point in a specific frame is some other frame on the same display screen and when an instruction is issued to move the focus from that target frame to the specific frame described above, the first anchor point which is one of the anchor points following the last stored anchor point and whose target frame is the other frame described above is the next-order focus item.

(e) The history information on the selection (determination) of the focus item in the frame is stored for (a)-(d) described above, and the direction (forward or backward) of the next-order focus item is determined based on the history information.

As described above, "next-order" may be determined by excluding particular focus items or changing the moving direction.

Figure 15:
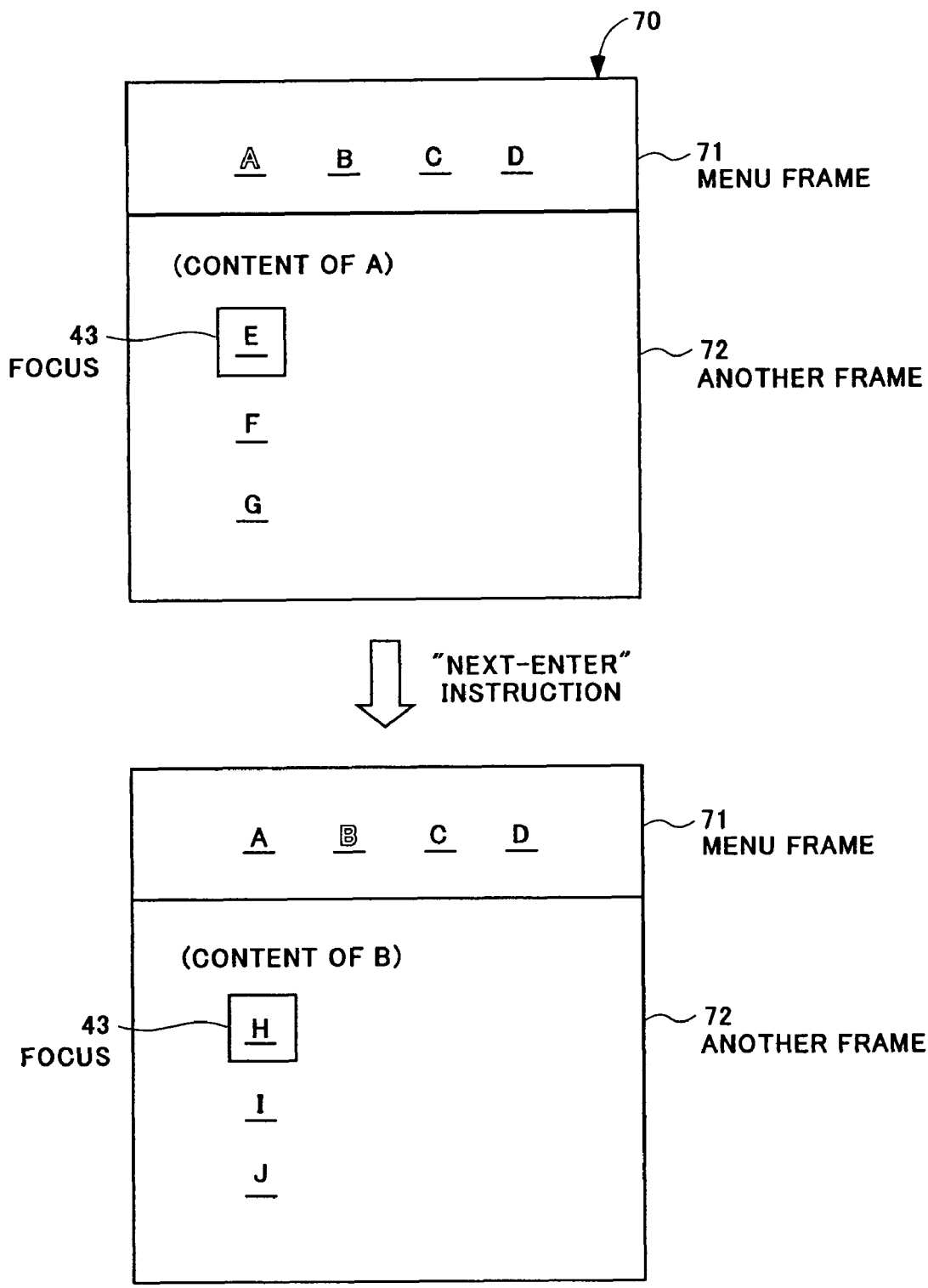
FIG. 15 is a diagram showing another embodiment of the present invention.

FIG. 15 is a diagram showing another embodiment of the present invention. The device configuration is the same as that in the embodiment described above and therefore the duplicate description is omitted. On a screen 70 that has the frame configuration shown in FIG. 15, when the user places the focus 43 on the first menu item (focus item "A") in a menu frame 71 to select it, moves the focus to another frame 72 and, after that, wants to see the content of the second menu item (focus item "B") in the menu frame 71, the embodiment described above requires the user to move the focus 43 to the menu frame 71 and press the enter key with the focus item "B" focused. However, if the user wants to select the focus item following the last focused focus item in the menu frame 71, the user can give a "next-enter" instruction and omit the following user operations.

(1) Move the focus 43 to the menu frame 71.
(2) Press the enter key with the focus item "B" focused and
(3) Move the focus 43 to the menu frame 72 if necessary.

Although, in the above description, the next-enter instruction is given when the focus 43 is in the other frame 72, the similar operation can be executed regardless of the position of the focus 43, for example, even when the focus 43 is in the menu frame. The "next-enter" instruction can be given by a specific key (for example, key 77) on the remote control 50 in FIG. 1(a) or by a specific key in the operation unit 13 in FIG. 1(b).

Figure 16:
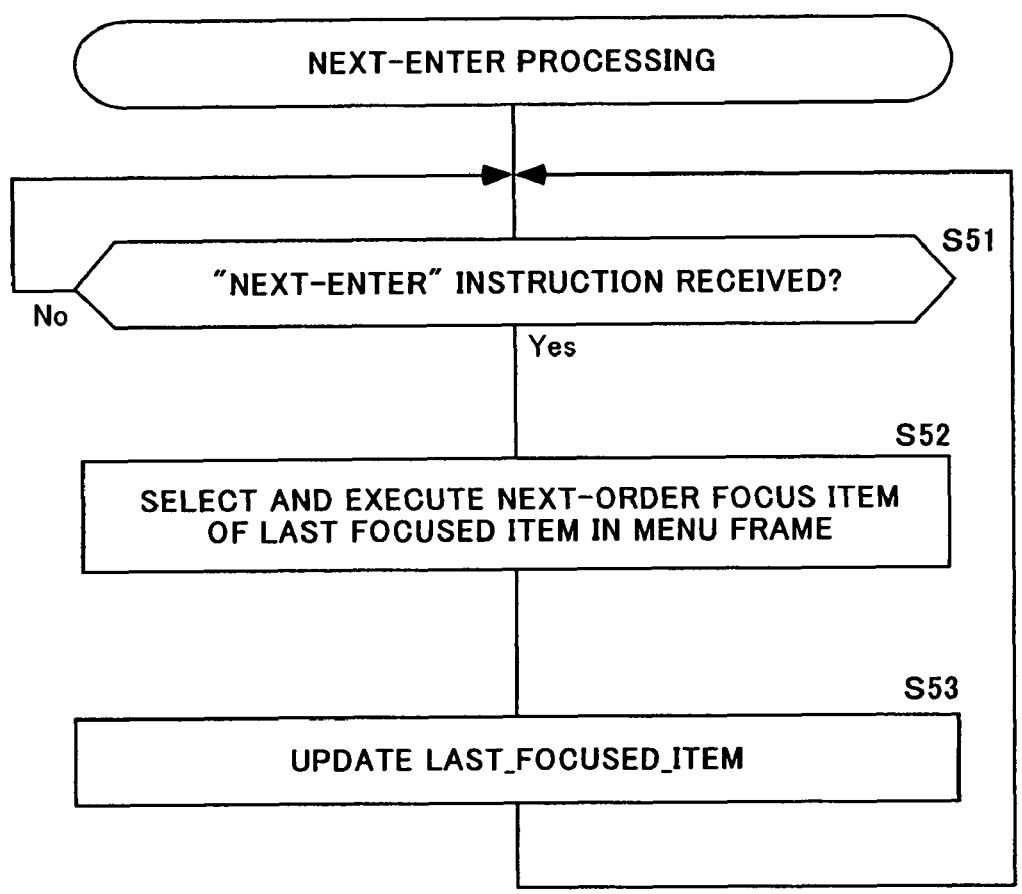
FIG. 16 is a flowchart showing the specific processing flow of next-enter processing in FIG. 15.

FIG. 16 shows a specific processing flow of the "next-enter" processing. When the "next-enter instruction is received (S51, Yes), the next-order focus item of the last focused item in the specific type of frame (menu frame in this case) is selected and executed (S52). At the same time, the in-frame last focused item (last_focused_item) is updated (S53) and control is passed back to step S51.

For example, when the user wants to sequentially browse the contents of plural menu items that are focus items in the menu frame described above, this next-enter function eliminates the need to execute the above-described redundant operations repeatedly. The next-enter function can be used with the focus position estimation (movement) function described above.

Although the preferred embodiments of the present invention have been described above, it is to be understood that various other changes and modifications can be performed.

For example, the television set and the mobile phone in FIG. 1(a) and FIG. 1 (b) are exemplary only and the present invention is not limited to those devices. The present invention is applicable to any device that is a markup language document processing device capable of displaying data in frames and that allows the user to move the focus to focus items by means of cursor operation keys and so on. For example, the present invention is applicable to those devices such as a car navigation system, a game machine, a personal digital assistant (PDA), and a device control terminal. The present invention does not exclude an application to a device having direct pointing means.

The cyclic frame switching by means of the frame switching key 77 may also include the reverse-sequence switching by combining the frame switching key 77 with some other key.

The present invention is applicable not only to the markup language processing for web browsing but also to the display of data, described in a markup language, on a device not related to web browsing.

A "frame" in this specification is not limited to a frame in a narrower sense that is coded in HTML but represents any display area (display frame). Although a frame is thought of as a display area created by dividing one window in the above description, separate display areas in different windows are also thought of as "frames" of the present invention as long as the focus moves among them.

Note that the contents displayed on the display screen need not always be described in a markup language. That is, the contents may also be contents having a configuration in which a specific file is displayed in the display screen based on an anchor point. The files and contents may be obtained via a network or stored in the device.

INDUSTRIAL APPLICABILITY

The present invention is applicable to a markup language document processing device that processes a document described in a markup language. More specifically, the present invention is applicable to a television set, a portable terminal device, a car navigation system, a game machine, a home electric appliance, and any other device that can display such document.

The invention claimed is:

1. A device for processing a document described in a markup language, comprising:
    a display screen;
    a focus movement operator;
    a memory; and
    a processor configured to:
    move a focus sequentially to a plurality of focus items on the display screen using the focus movement operator; and
    control the movement of the focus in response to an operation of said focus movement operator, wherein
    to control the movement of the focus, the processor is further configured to:
        when the display screen currently displays a plurality of frames, including a first frame and a second frame, determine if focus items exist in the first frame in a first direction in response to the operation of the focus movement operator in the first direction,
        when no focus items are determined to exist in the first frame in the first direction, move the focus from the first frame into the second frame in a second direction,
        store, in the memory, information on a last focused focus item in the first frame before the movement, and
        move the focus from the second frame to the last focused focus item in the first frame via the focus movement operator.

2. The device according to claim 1, wherein, if no focus item is stored for the second frame when the focus is moved from the first frame to the second frame by the operation of said focus movement operator, the focus is moved to a focus item in the second frame, wherein the focus item in the second frame is determined by a predetermined rule.

3. The device according to claim 1, wherein, when moving the focus from the second frame to the first frame, if the last focused focus item for the first frame is not in a current display area of the first frame, the focus is moved to a displayed focus item that is one of the focus items displayed in the display area and that is determined by a predetermined rule.

4. The device according to claim 1, wherein the processor is further configured to activate only one of the plurality of frames at a time, focus only on an active focus item in the activated frame, switch an active frame among the plurality of frames via an operation of a frame switching key, and move the focus from the second frame to the last focused focus item in the first frame.

5. The device according to claim 1, wherein the processor is further configured to store information a last focused focus item for each of the plurality of frames.

6. The device according to claim 1, wherein the processor is further configured to store the information on the last focused focus item only for an in-frame document displayed on the display screen.

7. The device according to claim 1, wherein the processor is further configured to move the focus only to a focus item in a specific type of frame.

8. The device according to claim 7, wherein the specific type of frame is a menu frame including a plurality of menu items, and wherein the processor is further configured to determine whether a frame is a menu frame based on predetermined conditions.

9. A computer program product comprising a non-transitory computer-readable storage media storing computer readable instructions, which, when executed by a computer for processing a document described in a markup language, cause the computer to perform the steps of:
    moving a focus sequentially to a plurality of focus items on a display screen using a focus movement operator;
    controlling the movement of the focus in response to an operation of said focus movement operator, wherein
    to control the movement of the focus, the instructions further cause the computer to:
        when the display screen currently displays a plurality of frames, including a first frame and a second frame, determine if focus items exist in the first frame in a first direction in response to the operation of the focus movement operator in the first direction,
        when no focus items are determined to exist in the first frame in the first direction, move the focus from the first frame into the second frame in a second direction,
        store information on a last focused focus item in the first frame before the movement, and
        move the focus from the second frame to the last focused focus item in the first frame via the focus movement operator.

10. The computer program product according to claim 9, further causing the computer to perform the step of, if no focus item is stored for the second frame when the focus is moved from the first frame to the second flame by the operation of said focus movement operator, moving the focus to a focus item in the second flame, wherein the focus item in the second frame is determined by a predetermined rule.

11. The computer program product according to claim 9, further causing the computer to perform the step of, when moving the focus from the second frame to the first frame, if the last focused focus item for the first frame is not in a current display area of the first frame, moving the focus to a displayed focus item that is one of the focus items displayed in the display area and that is determined by a predetermined rule.

12. The computer program product according to claim 9, further causing the computer to perform the steps of activating only one of the plurality of frames at a time, focusing only on an active focus item in the activated frame, and switching an active frame among the plurality of frames in response to a frame switching instruction, wherein the focus is moved from the second frame to the last focused focus item in the first frame in response to the frame switching instruction.

13. The computer program product according to claim 9, wherein the focus is moved only to a focus item in a specific type of frame.

* * * * *